(12) United States Patent
Miyadera et al.

(10) Patent No.: US 7,577,328 B2
(45) Date of Patent: Aug. 18, 2009

(54) OPTICAL REFLECTOR, OPTICAL SYSTEM AND OPTICAL MULTIPLEXER/DEMULTIPLEXER DEVICE

(75) Inventors: Nobuo Miyadera, Tsukuba (JP); Rei Yamamoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/748,697

(22) Filed: May 15, 2007

(65) Prior Publication Data

US 2007/0230868 A1    Oct. 4, 2007

Related U.S. Application Data

(63) Continuation of application No. PCT/JP2005/020940, filed on Nov. 15, 2005.

(30) Foreign Application Priority Data

Nov. 15, 2004  (JP) ............................. 2004-330599
Mar. 4, 2005   (JP) ............................. 2005-061032

(51) Int. Cl.
    *G02B 6/42* (2006.01)
(52) U.S. Cl. .................. 385/47; 398/150; 398/154; 398/155
(58) Field of Classification Search .................. 398/79, 398/82, 87, 48, 72; 359/333, 337; 385/27, 385/28, 50
See application file for complete search history.

(56) References Cited

U.S. PATENT DOCUMENTS 4,900,119 A  *  2/1990  Hill et al. ...................... 385/27
4,923,271 A     5/1990  Henry et al.

(Continued)

FOREIGN PATENT DOCUMENTS

EP         0707 224 A1     4/1996

(Continued)

OTHER PUBLICATIONS

Hironori Tanaka, et al.; Development of High Isolation WDM; 2004 General Conference of the Institute of Electronics, Information and Communication Engineers; March; pp. 1-2.

*Primary Examiner*—James P Hughes
*Assistant Examiner*—Peter Radkowski
(74) *Attorney, Agent, or Firm*—Antonelli, Terry, Stout & Kraus, LLP.

(57) ABSTRACT

An optical reflector, an optical multiplexer/demultiplexer device and an optical system which can allow more flexible arrangement of an optical filter thereof, and enhance performance of wavelength division multiplexing communication thereof are provided.

An optical reflector according to the present invention comprises a first and second optical fiber 14, 16, each being connected to one side of an optical propagating region such as a rod lens 12 causing optical strength distributions depending on respective wavelengths of lights to be propagated in the optical propagating region; a mirror 18 disposed on the other side of the optical propagating region; and an optical filter 20 disposed between the first and second optical fibers 14, 16 and the mirror 18. The optical filter 20 is reflected a light having a first wavelength and allows another light having a second wavelength to be transmitted therethrough; and the mirror 18 is reflected the light having the second wavelength, so that the lights having the first and second wavelengths are propagated between the first optical fiber 14 and the second optical fiber 16.

23 Claims, 11 Drawing Sheets

U.S. PATENT DOCUMENTS

| | | | |
|---|---|---|---|
| 5,050,952 A * | 9/1991 | FussgaKurt | 398/44 |
| 5,416,866 A | 5/1995 | Sahlen | |
| 5,479,547 A * | 12/1995 | Kunikane et al. | 385/47 |
| 5,579,154 A * | 11/1996 | Mueller-Fiedler et al. | 359/341.1 |
| 5,627,927 A * | 5/1997 | Udd | 385/37 |
| 5,629,995 A * | 5/1997 | Duck et al. | 385/24 |
| 5,680,235 A * | 10/1997 | Johansson | 398/7 |
| 5,778,118 A * | 7/1998 | Sridhar | 385/24 |
| 5,790,314 A * | 8/1998 | Duck et al. | 359/654 |
| 5,793,908 A | 8/1998 | Mizuochi et al. | |
| 5,799,120 A | 8/1998 | Kurata et al. | |
| 5,799,121 A * | 8/1998 | Duck et al. | 385/47 |
| 5,850,301 A | 12/1998 | Mizuochi et al. | |
| 5,861,967 A | 1/1999 | Mizuochi et al. | |
| 5,889,899 A * | 3/1999 | Henry et al. | 385/10 |
| 5,889,900 A * | 3/1999 | Hallemeier | 385/11 |
| 6,061,481 A * | 5/2000 | Heidrich et al. | 385/14 |
| 6,084,694 A * | 7/2000 | Milton et al. | 398/83 |
| 6,144,785 A | 11/2000 | Fujita | |
| 6,310,994 B1 * | 10/2001 | Jones et al. | 385/24 |
| 6,347,170 B1 * | 2/2002 | Zheng | 385/34 |
| 6,493,117 B1 * | 12/2002 | Milton et al. | 398/49 |
| 6,529,300 B1 * | 3/2003 | Milton et al. | 398/59 |
| 6,556,321 B1 * | 4/2003 | Milton et al. | 398/79 |
| 6,611,642 B1 * | 8/2003 | O'Neill et al. | 385/33 |
| 6,631,018 B1 * | 10/2003 | Milton et al. | 398/59 |
| 6,678,080 B2 * | 1/2004 | Tervonen et al. | 398/82 |
| 6,744,945 B2 | 6/2004 | Kinoshita et al. | |
| 6,748,174 B2 * | 6/2004 | Milton et al. | 398/79 |
| 6,751,418 B2 * | 6/2004 | Milton et al. | 398/79 |
| 6,757,498 B2 * | 6/2004 | Milton et al. | 398/79 |
| 6,775,479 B2 * | 8/2004 | Milton et al. | 398/79 |
| 6,782,162 B2 * | 8/2004 | Fukuzawa et al. | 385/34 |
| 6,795,652 B2 * | 9/2004 | Milton et al. | 398/79 |
| 6,813,405 B1 * | 11/2004 | Bendett et al. | 385/14 |
| 6,873,758 B1 * | 3/2005 | Carter et al. | 385/24 |
| 6,892,032 B2 * | 5/2005 | Milton et al. | 398/79 |
| 6,904,203 B2 * | 6/2005 | Logvin et al. | 385/37 |
| 6,925,227 B2 * | 8/2005 | Asano et al. | 385/34 |
| 6,950,571 B1 * | 9/2005 | Hughes et al. | 385/24 |
| 2001/0053262 A1 | 12/2001 | Kinoshita et al. | |
| 2003/0002809 A1 * | 1/2003 | Jian | 385/73 |
| 2003/0223670 A1 * | 12/2003 | Nikolov et al. | 385/11 |
| 2004/0042720 A1 * | 3/2004 | Asano et al. | 385/34 |
| 2005/0175276 A1 * | 8/2005 | Hashizume et al. | 385/24 |
| 2005/0201656 A1 * | 9/2005 | Nikolov et al. | 385/11 |

FOREIGN PATENT DOCUMENTS

| | | |
|---|---|---|
| JP | 01-096605 | 4/1989 |
| JP | 03-033805 | 2/1991 |
| JP | 06-194613 | 7/1994 |
| JP | 09-121203 | 5/1997 |
| JP | 09-159851 | 6/1997 |
| JP | 09-507313 | 7/1997 |
| JP | 11-258463 | 9/1999 |
| JP | 2002-006155 | 1/2002 |
| JP | 2003-172806 | 6/2003 |
| JP | 2004-138680 | 5/2004 |
| JP | 2004-271894 | 9/2004 |
| JP | 2004-354483 | 12/2004 |

* cited by examiner

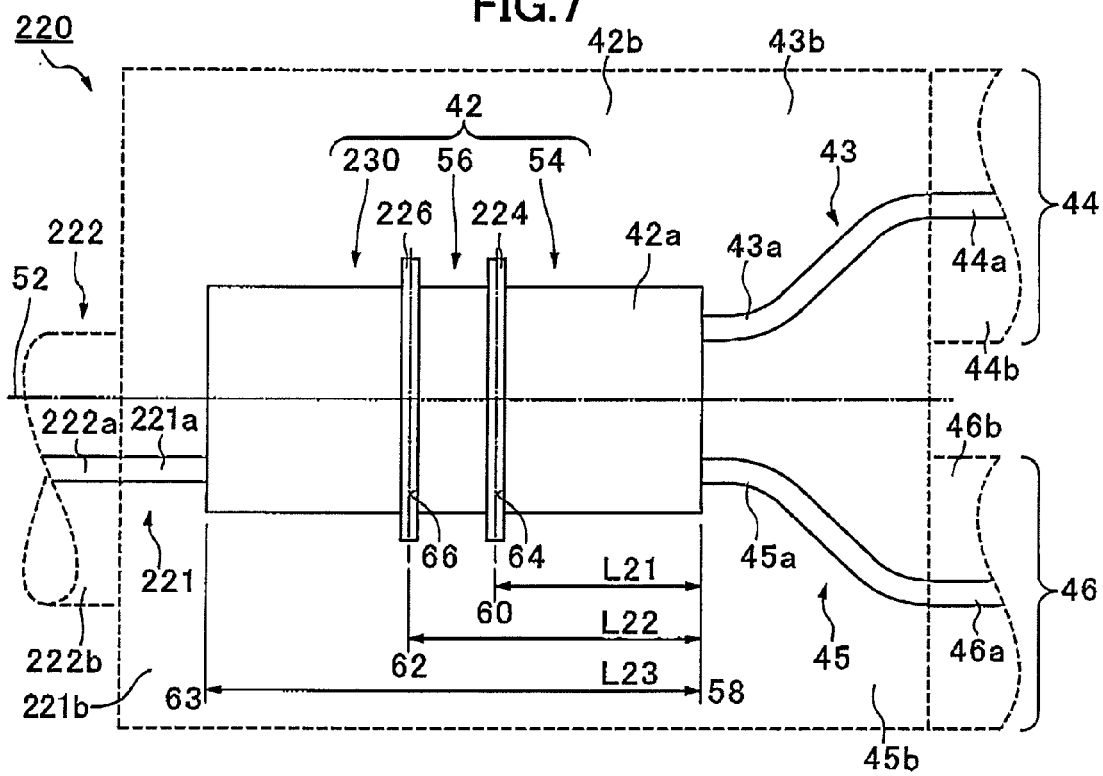
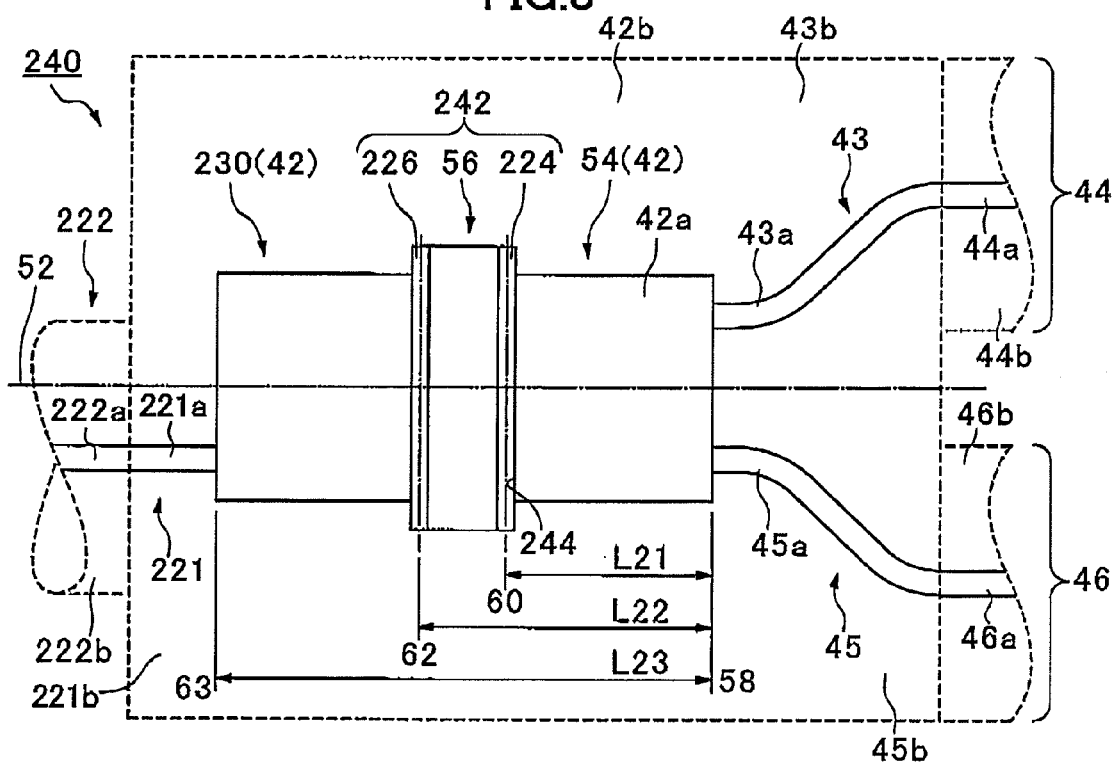

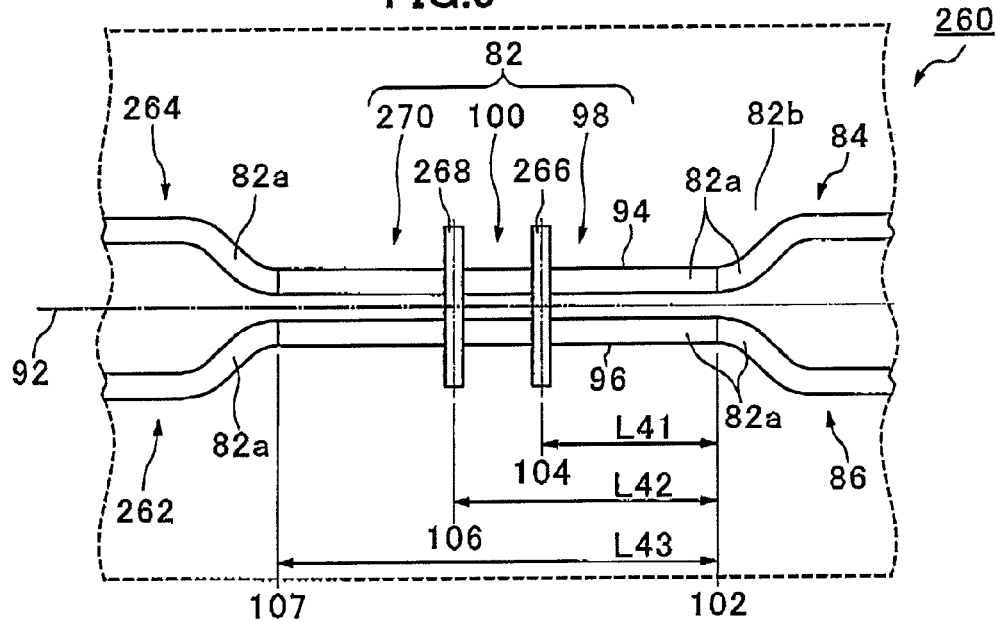
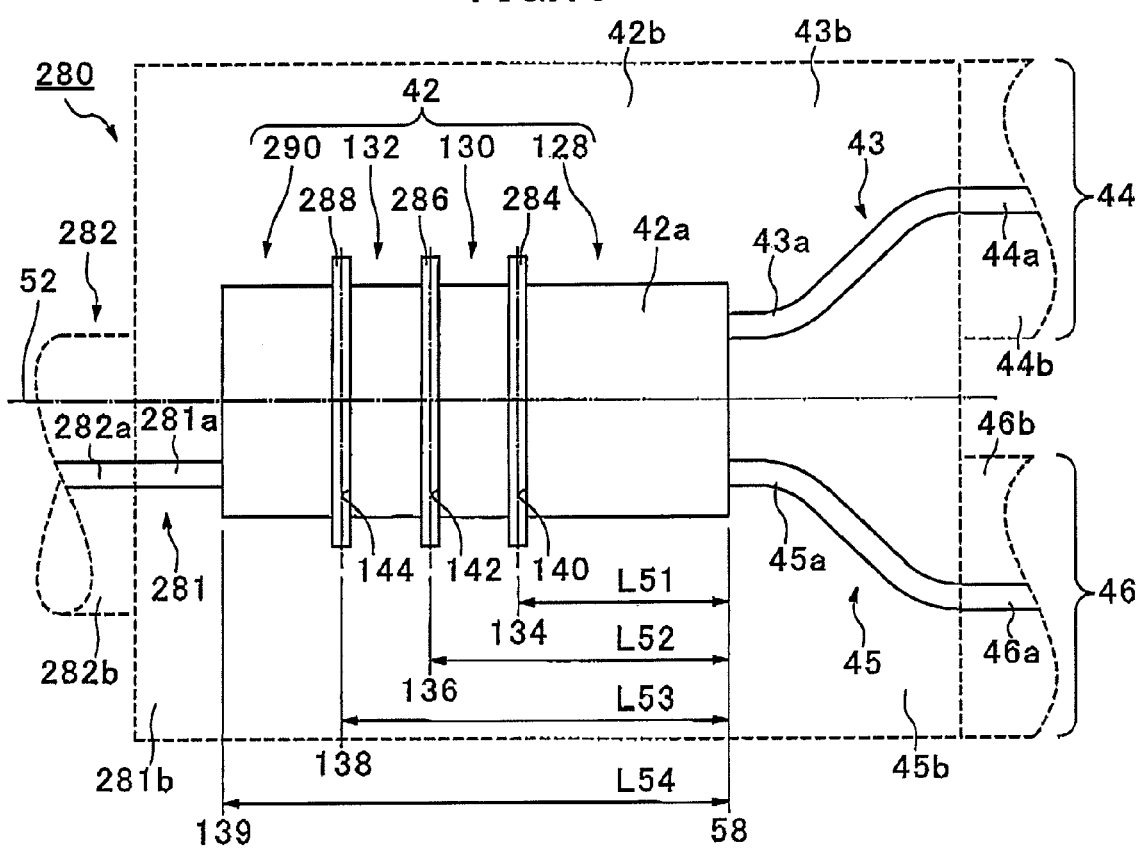

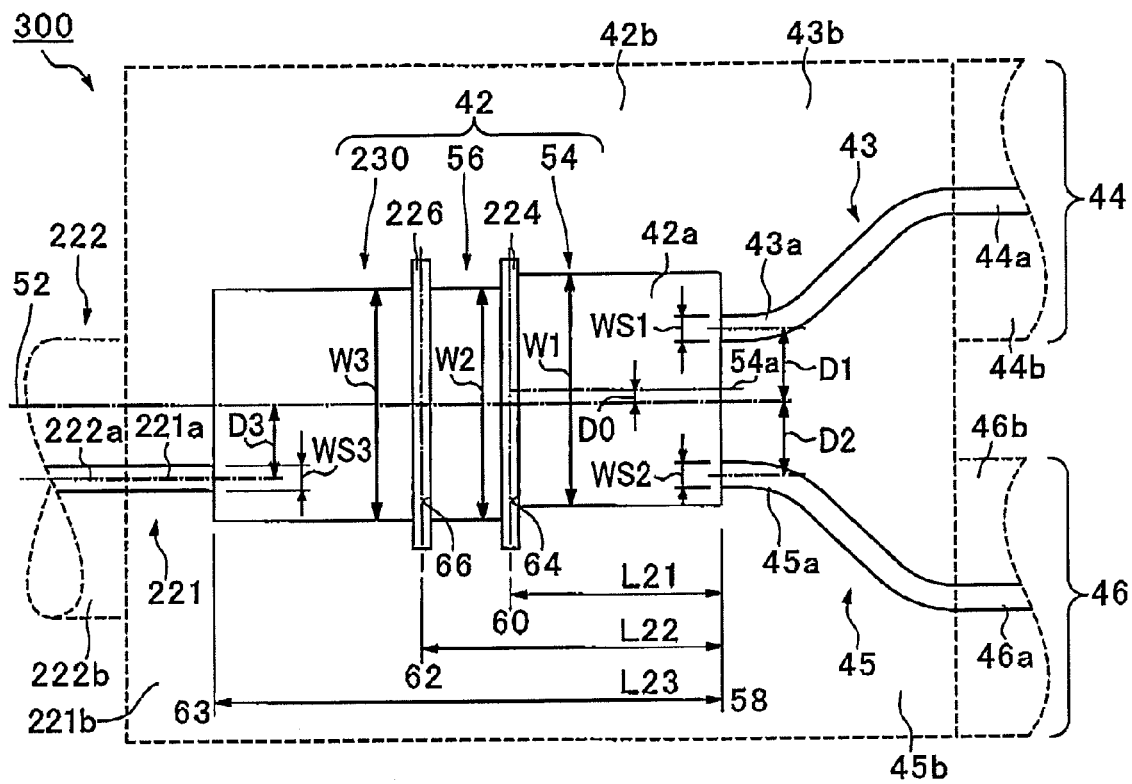

US 7,577,328 B2

OPTICAL REFLECTOR, OPTICAL SYSTEM AND OPTICAL MULTIPLEXER/DEMULTIPLEXER DEVICE

This application is a Continuation application under 35 USC 365 and 35 USC 120 of prior International (PCT) Application No. PCT/JP2005/020940, filed Nov. 15, 2005.

FIELD OF THE INVENTION

The present invention relates to an optical reflector, an optical system and an optical multiplexer/demultiplexer device, and more specifically, to those in which wavelength division multiplexing (WDM) communication is performed through an optical propagating region causing a distribution of optical strength depending on a wavelength of the light to be propagated.

BACKGROUND OF THE INVENTION

Recently, research on a wavelength division multiplexing (WDM) communication system for higher-speed and larger-capacity communications has been actively promoted. One of the key optical components used in the WDM communication system is an optical multiplexer/demultiplexer device for coupling or splitting a plurality of lights having respective wavelengths. An exemplary optical multiplexer/demultiplexer device is disclosed in Patent Publication 1 and Non-Patent Publication 1 listed later.

Referring to FIG. 16, a prior art straight-optical-waveguide type optical multiplexer/demultiplexer device shown in FIG. 1 in Patent Publication 1 will be explained. FIG. 16 is a schematic view of a straight-optical-waveguide type optical multiplexer/demultiplexer device. The straight-optical-waveguide type optical multiplexer/demultiplexer device 400 has first and second straight optical waveguides 402, 404 which intersect each other at a junction at an angle 2θ, an optical filter 406 disposed at the junction, and a third straight optical waveguide 408 disposed on a line extended along the first straight waveguide 402 and on the opposite side thereof relative to the optical filter 406. The optical filter 406 is defined by a dielectric multilayer film. Further, the optical filter 406 is positioned and oriented so that an equivalent reflection center plane 406a thereof includes an intersecting point 410 of optical axes 402a, 404a, 408a of the above three straight waveguides 402, 404, 408, and the first straight waveguide 402 defines a mirror image of the second straight waveguide 404 relative to the reflection center plane 406a.

In Patent Publication 1, although only propagation of two lights having respective wavelengths of 1.3 μm and 1.5 μm is described, propagation of three lights having respective wavelengths can be achieved. For example, in the straight-waveguide type optical multiplexer/demultiplexer device 400 shown in FIG. 16, when the optical filter 406 is an LPF (Long wavelength Pass Filter) allowing a light having a wavelength zone of 1.55 μm to be transmitted therethrough and reflecting lights having respective wavelength zones of 1.49 μm and 1.31 μm, a light having a wavelength of 1.55 μm and input into the first straight waveguide 402 is transmitted through the optical filter 406 to the third straight waveguide 408, and lights having respective wavelengths of 1.49 μm and 1.31 μm are reflected at the optical filter 406 and transmitted to the second straight waveguide 404.

Further, referring to FIG. 17, a multimode-optical-waveguide type optical multiplexer/demultiplexer device employing one optical filter and shown in FIG. 9 in Patent Publication 1 will be explained. FIG. 17 is a schematic view of the multimode-optical-waveguide type optical multiplexer/demultiplexer device. The multimode-optical-waveguide type optical multiplexer/demultiplexer device 420 has first and second multimode-interference type optical waveguide sections 424, 426 disposed on the opposite sides of an optical filter 422 to sandwich it, first and second single-mode optical waveguides 428, 430 connected to the first multimode waveguide section 424, and a third single-mode optical waveguide 432 connected to the second multimode waveguide section 426. The optical filter 422 is made of a dielectric multilayer film reflecting a light having a wavelength of 1.3 μm and allowing a light having a wavelength of 1.5 μm to be transmitted therethrough when each of these lights is input into the optical filter 422 at an incident angle of 0 degree.

In Patent Publication 1, although only propagation of two lights having respective wavelengths of 1.3 μm and 1.5 μm is described, propagation of three lights having respective wavelengths can be achieved. For example, in the multimode-interference type optical multiplexer/demultiplexer device 420 shown in FIG. 17, when the optical filter 422 is an LPF (Long wavelength Pass Filter) allowing a light having a wavelength zone of 1.55 μm to be transmitted therethrough and reflecting lights having respective wavelength zones of 1.49 μm and 1.31 μm, a light having a wavelength of 1.55 μm and input through the first single-mode waveguide 428 into the first multimode waveguide section 424 is transmitted through the optical filter 422 and the second multimode waveguide section 426 to the third single-mode waveguide 432, and lights having respective wavelengths of 1.49 μm and 1.31 μm are reflected at the optical filter 422 and transmitted through the first multimode waveguide section 424 to the second single-mode waveguide 430.

Next, referring to FIG. 18, a rod-lens type optical multiplexer/demultiplexer device disclosed in Non-Patent Publication 1 will be explained. FIG. 18 is a schematic view of a rod-lens type optical multiplexer/demultiplexer device. A rod-lens type optical multiplexer/demultiplexer device 440 has first and second rod lens sections 444, 446 disposed on the opposite sides of an optical filter 442 to sandwich it, first and second optical fibers 448, 450 connected to the first rod lens section 444, and a third optical fiber 452 connected to the second rod lens section 446. The optical filter 442 is made of a dielectric multilayer film. Each of the rod lens sections 444, 446 is provided with a gradient of refractive index inside thereof so that a light beam input into the rod lens sections 444, 446 is collimated, namely, changed into a parallel beam of light, or focused to a point. For example, when a length of the rod lens sections 444, 446 is a quarter of a pitch which is a cycle of a serpentine light path depending on a wavelength of a light, a beam of light input at one end of the rod lens sections 444, 446 is changed into a parallel beam of light at the other end thereof.

When the optical filter 442 is an LPF (Long wavelength Pass Filter) allowing a light having a wavelength zone of 1.55 μm to be transmitted therethrough and reflecting lights having respective wavelength zones of 1.49 μm and 1.31 μm, a light having a wavelength of 1.55 μm and input into the first optical fiber 448 is transmitted through the optical filter 442 to the third optical fiber 452, a light having a wavelength of 1.49 μm and input into the first optical fiber 448 is reflected at the optical filter 442 and transmitted to the second optical fiber 450, and a light having a wavelengths of 1.31 μm and input into the second optical fiber 450 is reflected at the optical filter 442 and transmitted to the first optical fiber 448.

Patent Publication 1: Japanese Patent Laid-open Publication No. 2002-6155 (FIGS. 1 and 3)

Non-Patent Publication 1: Hironori Tanaka et al., Collected Lecture Papers from General Convention of the Institute of Electronics, Information, and Communication Engineers, March, 2004, p. 276, C-3-102; "Development of Optical Multiplexer/demultiplexer Device Having a High Isolation Property"

PROBLEM TO BE SOLVED BY THE PRESENT INVENTION

In the straight-optical-waveguide type optical multiplexer/demultiplexer device 400 and the multimode-optical-waveguide type optical multiplexer/demultiplexer device 420 disclosed in Patent Publication 1 and the rod-lens type optical multiplexer/demultiplexer device 440 disclosed in Non-Patent Publication 1, the lights having the respective wavelengths of 1.49 μm and 1.31 μm will be discussed.

In the straight-optical-waveguide optical multiplexer/demultiplexer device 400, when the optical filter 406 is oriented and positioned in the above-stated way, lights having respective wavelengths of 1.49 μm and 1.31 μm and input into the first straight waveguide 402 are reflected at the optical filter 406 and input to the second straight waveguide 404, regardless of a difference in their wavelengths. Thus, there is almost no difference between insertion loss of the light having the wavelength of 1.49 μm and that of the light having the wavelength of 1.31 μm when they are transmitted to the second straight waveguide 404. However, when the orientation and the position of the optical filter 406 is slightly shifted, the above-stated lights reflected at the optical fiber 406 are not input into the second straight waveguide 404 so that insertion loss of the above-stated lights input into the second straight waveguide 404 is greatly increased. In order to reduce such insertion loss, it is necessary to strictly orient and position the optical filter 406 in the above-stated way and thus achieving such orientation and position of the optical filter 406 is trouble.

In the multimode-waveguide type optical multiplexer/demultiplexer device 420, an interference length L based on a property of a multimode optical waveguide depends on a wavelength of a light, namely, the shorter a wavelength of light is, the longer an interference length is. For example, when an interference length is determined so that a distribution rate (a transmission rate of a reflection rate) of the light having the shorter wavelength is 100%, that of the light having the longer wavelength becomes less than 100%. Thus, when the multimode-waveguide type optical multiplexer/demultiplexer device 420 is used for propagation of three lights having respective three wavelengths, insertion loss of lights which is the total loss of excess loss, coupling loss and so on of the optical waveguide may be increased or leakage to an undesired port (crosstalk) may be caused so that it is impossible for all of the lights having respective wavelengths to have respective good properties.

In the rod-lens type optical multiplexer/demultiplexer device 440, the lights having the wavelengths of 1.49 μm and 1.31 μm and input through the first optical fiber 448 are collimated to become close to a parallel beam of light. Since a length of a rod lens required for a light to fully become a parallel beam of a light is different depending on a wavelength of a light, when the lights having respective waveguides of 1.49 μm and 1.31 μm are reflected at the optical filter 442, at least one of the lights does not fully become a parallel beam. When such a light which has not fully become a parallel beam is reflected at the optical filter 442, a light input through the rod lens section 444 to the second optical fiber 450 cannot be fully focused so that the power of the light is reduced and insertion loss of light transmitted to the second optical fiber 450 is caused. Thus, in the rod-lens type optical multiplexer/demultiplexer device 440, when a length of the rod lens sections 444, 446 is freely determined based on one of the two lights to be propagated therein, another length of the rod lens sections 444, 446 cannot be freely determined based on the other of the two lights. Namely, it is possible to enhance a performance of optical wavelength division multiplexing communication.

Thus, an object of the present invention is to provide an optical reflector, an optical multiplexer/demultiplexer device and an optical system which can allow more flexible arrangement of an optical filter thereof, and enhance performance of wavelength division multiplexing communication thereof.

SUMMARY OF THE INVENTION

To achieve the above-stated object, an optical reflector according to the present invention comprises an optical propagating region causing optical strength distributions depending on respective wavelengths of lights to be propagated in the optical propagating region; first and second optical input/output means, each being connected to one side of the optical propagating region; a mirror disposed on the other side of the optical propagating region; and a first optical filter disposed in the optical propagating region between the first and second optical input/output means and the mirror; wherein the first optical filter is reflected a light having a first wavelength and allows another light having a second wavelength to be transmitted therethrough; and the mirror is reflected the light having the second wavelength, so that the lights having the first and second wavelengths are propagated between the first input/output means and the second input/output means.

In this optical reflector, for example, a light having a first wavelength input through the first optical input/output means into the optical propagating region is reflected at the optical filter and transmitted to the second optical input/output means.

Further, for example, a light having a second wavelength input through the second optical input/output means into the optical propagating region is transmitted through the optical filter, reflected at the mirror and transmitted through the optical filter again to the first optical input/output means.

Since the present invention employs an optical propagating region causing a distribution of optical strength depending on a wavelength of a light to be propagated, unlike in the case of a straight optical waveguide, even if a position of the mirror or the optical filter is slightly shifted, a great loss of lights would not be caused. Thus, the mirror and the optical filter can be arranged more flexibly.

Further, when a light input through the first input/output means into the optical propagating region is reflected to be transmitted to the second input/output means, it is preferable that strength of light input into the second input/output means is great so that loss of lights to be propagated can be reduced. However, when lights having respective first and second wavelengths are propagated between the first input/output means and the second input/output means, a distribution of optical strength is caused in the optical propagating region based on each of wavelengths of lights to be propagated. In prior art, when there is only one reflecting element such as an optical filter, if a strength of one of the lights input into the second input/output means is great, that of the other light input into the second input/output means would become small. In the present invention, since there are two reflecting elements, namely, an optical filter and a mirror, after a strength of one of the lights input into the second input/output means is adjusted, for example, by shifting the position of the optical filter, a strength of the other light input into the second input/output means can be independently adjusted by adjusting the mirror. This increases a degree of freedom of design of the optical reflector to propagate two of more lights having respective wavelengths. Further, a performance of wavelength division multiplexing communication of the optical reflector can be enhanced The above-stated optical input/output means includes, for example, an optical waveguide and an optical fiber.

The optical reflector, preferably, further comprising an additional optical filter or additional optical filters disposed between the first optical filter and the mirror; wherein the additional optical filter or each of the additional optical filters is reflected a light having a corresponding wavelength transmitted through the first optical filter, and, if it has it (them), other additional filter(s) located on a side of the first and second input/output means relative thereto, and allows the light having the second wavelength to be transmitted therethrough, so that the lights having the first and second wavelengths and the corresponding wavelength(s) are propagated between the first input/output means and the second input/output means.

In this optical reflector, in addition to propagation of the lights having the respective first and second wavelengths, an additional light having a predetermined wavelength can be transmitted between the first input/output means and second input/output means. For example, a light having a predetermined wavelength and input through the first input/output means into the optical propagating region is transmitted through the optical filter disposed on a first-and-second-input/output-means side relative to the additional optical filter, reflected at the additional optical filter, and transmitted through the optical filter again into the second input/output means. Similar to the lights having the first and second wavelengths, a strength distribution of the light having a predetermined wavelength and reflected at the additional optical filter can be changed by appropriately determining a length between the first and second input/output means and the additional optical filter. As a result, performance of the optical reflector in three-or-more-wavelength communication can be enhanced.

In this optical reflector, a combination of a mirror and one or more optical filter(s) or a combination of optical filters only may be integrally formed as a unit. In this case, a unit such as a mirror/filter unit and a filter/filter unit may be integrally formed by adhering the mirror and the optical filters to each other with an adhesive or resin such as an adhesive/refractive-index-adjusting agent, or by adhering a mirror and/or (an) optical filter(s) on the opposite sides of a plate member made of glass or plastic or a box made of glass and having an interior hollow space. By integrally forming the mirror and the optical filters as a unit, the number of processes for mounting the mirror and the optical filter is reduced so that a manufacturing cost can be reduced. Of course, when the mirror and the optical filters are formed as a unit, they can be mounted only once.

Further, such a unit can be formed by continuously layering materials in a mirror/optical-filter-forming process. In this case, a distance between the mirror and the optical filter can be very accurately controlled. In this way, integrally forming the mirror and one or more optical filter(s) as a unit allows fluctuation of a distance and/or an angle therebetween and fluctuation of properties of the unit to be reduced, as compared with the case where the mirror and the optical filters are mounted individually.

In the optical reflector according to the present invention, preferably, the optical propagating region is defined by a light-focusing element, a grating, a multimode optical waveguide, a Mach-Zehnder interferometer, or a directional optical coupler.

Such a light-focusing element, a grating, a multimode optical waveguide, a Mach-Zehnder interferometer, or a directional optical coupler can cause optical strength distributions depending on respective wavelengths of lights to be propagated therein.

In the optical reflector according to the present invention, preferably the optical propagating region includes a first optical propagating section between the first and second input/output means and the optical filter disposed closest thereto; and the first optical propagating section is offset relative to the other propagating sections in a direction perpendicular to a light propagating direction.

In this optical reflector, for example, when a light having a second wavelength input into the first input/output means is transmitted through the optical filter closest to the first and second input/output means, reflected at the optical filter on a third-input/output-means side, and transmitted to the second input/output means, an amount (reflection attenuation amount) of the light having the second wavelength and leaked into the first input/output means can be reduced.

To achieve the above-stated object, an optical system according to the present invention comprises an optical propagating region causing optical strength distributions depending on respective wavelengths of lights to be propagated in the optical propagating region; a first and second optical input/output means, each being connected to one side of the optical propagating region; a third optical input/output means connected to the other side of the optical propagating region; and an optical-filter-mounting means for mounting at least two optical filters in the optical propagating region between the first and second optical input/output means and the third optical input/output means.

In this optical system, when at least two optical filters are mounted to the optical-filter-mounting means, operations of this optical system are similar to those of the optical reflector according to the present invention and thus effects of the former similar to those of the latter can be obtained. Further, a light having a third wavelength can be propagated between the first input/output means and the third input/output means.

In the optical system according to the present invention, preferably, the optical propagating region is defined by a light-focusing element, a grating, a multimode optical waveguide, a Mach-Zehnder interferometer, or a directional optical coupler.

More preferably, the optical-filter-mounting means may be a groove disposed in the optical propagating region.

Further, each of the first, second and third input/output means may be a single-mode optical waveguide, or each of the first and second input/output means may be a single-mode optical waveguide and the third input/output means may be an optical fiber.

In the optical system according to the present invention, preferably, the optical propagating region includes a first optical propagating section between the first and second input/output means and the optical filter disposed closest thereto; and the first optical propagating section is offset relative to the other propagating sections in a direction perpendicular to a light propagating direction.

To achieve the above-stated object, an optical multiplexer/demultiplexer device according to the present invention comprises an optical propagating region causing optical strength distributions depending on respective wavelengths of lights to be propagated in the optical propagating region; a first and second optical input/output means, each being connected to one side of the optical propagating region; a third optical input/output means connected to the other side of the optical propagating region; and two optical filters disposed in the optical propagating region between the first and second optical input/output means and the third optical input/output means; wherein one of the optical filters on a side of the first and second optical input/output means is reflected a light having a first wavelength and allows other lights having a second and third wavelengths to be transmitted therethrough; wherein the other optical filter on a side of the third optical input/output means is reflected the light having the second wavelength and allows the light having the third wavelength to be transmitted therethrough; so that the lights having the first, second and third wavelengths are propagated between the first input/output means and the second input/output means.

Operations of this optical multiplexer/demultiplexer device are similar to those of the optical reflector according to the present invention and thus effects of the former similar to those of the latter can be obtained.

The optical multiplexer/demultiplexer device according to the present invention preferably further comprises an additional optical filter or additional optical filters disposed between the two optical filters; wherein the additional optical filter or each of the additional optical filters is reflected a light having a corresponding wavelength transmitted through the one of the two optical filters on the side of the first and second optical input/output means, and, if it has it/them, the other additional filter(s) located on a side of the first and second input/output means relative thereto, and allows the light having the second wavelength to be transmitted therethrough, so that the lights having the first and second wavelengths and the corresponding wavelength(s) are propagated between the first input/output means and the second input/output means.

In the optical multiplexer/demultiplexer device according to the present invention, preferably, the optical propagating region is defined by a light-focusing element, a grating, a multimode optical waveguide, a Mach-Zehnder interferometer, or a directional optical coupler.

In the optical multiplexer/demultiplexer device according to the present invention, preferably, the optical propagating region includes a first optical propagating section between the first and second input/output means and the optical filter disposed closest thereto; and the first optical propagating section is offset relative to the other propagating sections in a direction perpendicular to a light propagating direction.

In this optical multiplexer/demultiplexer device, for example, when a light having a second wavelength input into the first input/output means is transmitted through the optical filter closest to the first and second input/output means, reflected at the optical filter on a third-input/output-means side, and transmitted to the second input/output means, an amount (reflection attenuation amount) of the light having the second wavelength and leaked into the first input/output means can be reduced.

In the optical multiplexer/demultiplexer device according to the present invention, when the optical propagating region is defined by a multimode optical waveguide or a directional optical coupler, each of the first, second and third input/output means may be a single-mode optical waveguide, or each of the first and second input/output means may be a single-mode optical waveguide and the third input/output means may be an optical fiber.

In this optical multiplexer/demultiplexer device, a combination of a plurality of optical filters may be integrally formed as a unit. In this case, such a unit may be integrally formed by adhering optical filters to each other with an adhesive or resin such as an adhesive/refractive-index-adjusting agent, or by adhering optical filters on the opposite sides of a plate member made of glass or plastic or a box made of glass and having an interior hollow space. By integrally forming the plurality of optical fibers as a unit, the number of processes for mounting an optical filter are reduced so that a manufacturing cost can be reduced. Of course, when all of the optical filters are made as a unit, such optical filters can be mounted only once. Further, such a unit can be formed by continuously layering materials in an optical-filter-forming process. In this case, a distance between the optical filters can be very accurately controlled. In this way, integrally forming two or more optical filters as a unit allows fluctuation of a distance and/or an angle therebetween and fluctuation of properties of the unit to be reduced.

In the optical reflector according to the present invention, preferably, the optical filter allows the light having the third wavelength to be transmitted, and the mirror is defined by a second optical filter reflecting the light having the second wavelength and allows a light having a third wavelength to be transmitted therethrough.

The optical reflector can be used as a power monitor for detecting an optical strength of a light having a wavelength selected from wavelengths of lights propagated between the first input/output means and the second input/output means.

An optical reflector, an optical multiplexer/demultiplexer device and an optical system according to the present invention can enable an arrangement of an optical filter thereof to be more flexible and enhance performance of optical wavelength division multiplexing communication thereof.

BRIEF DESCRIPTION OF THE DRAWINGS

In the accompanying drawings:

FIG. 7 is a schematic plan view of an MMI-type optical multiplexer/demultiplexer device which is a second embodiment of the optical multiplexer/demultiplexer device according to the present invention;

FIG. 8 is a schematic plan view of an MMI-type optical multiplexer/demultiplexer device which is a third embodiment of the optical multiplexer/demultiplexer device according to the present invention;

FIG. 9 is a schematic plan view of a directional-coupler-type optical multiplexer/demultiplexer device which is a fourth embodiment of the optical multiplexer/demultiplexer device according to the present invention;

FIG. 10 is a schematic plan view of an MMI-type optical multiplexer/demultiplexer device which is a fifth embodiment of the optical multiplexer/demultiplexer device according to the present invention;

FIG. 11 is a schematic plan view of an MMI-type optical multiplexer/demultiplexer device which is a sixth embodiment of the optical multiplexer/demultiplexer device according to the present invention;

FIG. 12 is a schematic plan view of a directional-coupler-type optical multiplexer/demultiplexer device which is a seventh embodiment of the optical multiplexer/demultiplexer device according to the present invention;

DETAILED DESCRIPTION OF THE PREFERRED EMBODIMENTS

First Embodiment of the Optical Reflectors

Now, referring to the Figures, embodiments of the optical reflector and the optical multiplexer/demultiplexer device according to the present invention will be explained. It should be noted that profiles of optical reflectors and optical multiplexer/demultiplexer devices shown in FIGS. 1-15 are indicated by dotted lines to clarify these Figures.

Figure 1:
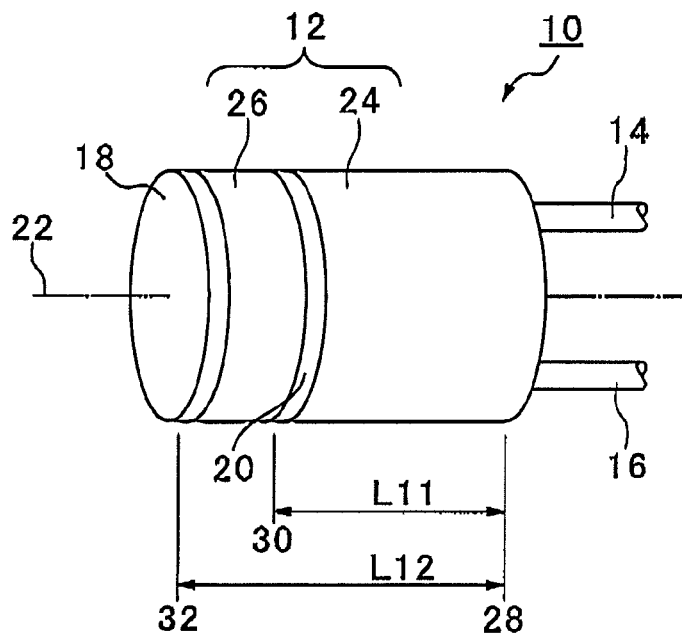
FIG. 1 is a schematic plan view of a rod-lens-type optical reflector which is a first embodiment of the optical reflector according to the present invention.

Firstly, a first embodiment of an optical reflector according to the present invention will be explained. FIG. 1 is a schematic plan view of a rod-lens-type optical reflector which is a first embodiment of the optical reflector according to the present invention. In this embodiment, an exemplary operation in which lights having respective wavelengths of 1.49 μm and 1.31 μm are propagated is explained.

As shown in FIG. 1, a rod-lens-type optical reflector 10 has a rod lens 12 which defines an optical propagating region, a first optical fiber 14 which defines first optical input/output means connected to one side of the rod lens 12, a second optical fiber 16 which defines second optical input/output means connected to the one side of the rod lens 12, a mirror 18 provided on the other side of the rod lens 12, and an optical filter 20 disposed in the rod lens 12 between the first and second optical fibers 14, 16 and the mirror 18.

The rod lens 12 has a cylindrical lens with an axis 22 and is provided with a gradient of refractive index inside thereof so that a light beam input into the rod lens 12 is collimated, namely, changed into a parallel beam of light, or focused to a point. For example, when a length of the rod lens 12 is a quarter of a pitch which is a cycle of a serpentine light path depending on a wavelength of light, a beam of light input at one end of the rod lens 12 is changed into a parallel beam of light. The rod lens 12 includes a first rod lens section 24 disposed between the first and second optical fibers 14, 16 and the optical filter 20, and a second rod lens section 26 disposed between the optical filter 20 and the mirror 18. The rod lens 12 is preferably made of, for example, quartz.

The first and second optical fibers 14, 16 are symmetrically disposed relative to the axis 22 and are substantially parallel to each other within ±15 degrees. Further, the first and second optical fibers 14, 16 are fixed to the rod lens 12 by means of a fusion bond or an adhesive.

The optical filter 20 is preferably formed of a dielectric multiple-layer film. In this embodiment, the optical filter 20 is a LPF (Long wavelength Pass Filter) allowing a light having a wavelength zone of 1.49 μm to be transmitted therethrough and reflecting a light having a wavelength zone of 1.31 μm. A distance L11 from a connecting location 28 to an equivalent reflection center plane 30 of the optical filter 20 is preferably, for example, a quarter or half of a pitch of a light having the shorter wavelength, namely, that of 1.3 μm. The reflection center plane 30 of the optical filter 20 is preferably within a range of 90±5 degrees relative to the axis 22.

The mirror 18 is preferably formed of a dielectric multiple-layer film, but any material can be used for the mirror 18 if the material can reflect the light having the shorter wavelength, i.e., that of 1.31 μm. For example, the mirror 18 may be formed of an optical filter. A distance L12 from the connecting location 28 to an equivalent reflection center plane 32 of the mirror 18 is preferably, for example, a quarter or half of a pitch of a light having the longer wavelength, namely, that of 1.49 μm. The reflection center plane 32 of the mirror 18 is preferably within a range of 90±5 degrees relative to the axis 22.

Next, an operation of the rod-lens-type optical reflector which is the first embodiment of the optical reflector according to the present invention and in which the distance L11 is a quarter of the pitch of the light having the shorter wavelength, namely, that of 1.31 μm will be described.

When a light having a wavelength of 1.31 μm is input from the first optical fiber 14 into the rod lens 12, the light is reflected at the optical filter 20 to return back and is then transmitted to the second optical fiber 16. Further, when a light having a wavelength of 1.49 μm is input from the first optical fiber 14 into the rod lens 12, the light is transmitted through the optical filter 20, reflected at the mirror 18 to return back, is then transmitted through the optical filter 20 to the second optical fiber 16. As a result, two lights having respective wavelengths can be transmitted between the first optical fiber 14 and the second optical fiber 16.

Specifically, the lights having the respective wavelengths of 1.49 μm and 1.31 μm input from the first optical fiber 14 are collimated in the rod lens 12 so that they become close to parallel light beams. The light having the wavelength of 1.31 μm becomes a parallel light beam and is reflected as it reaches the reflection center plane 30 of the optical filter 20. The light having the wavelength of 1.49 μm becomes a parallel light beam and is reflected as it reaches the reflection center plane 32 of the mirror 18. Then, the lights having the respective wavelengths of 1.49 μm and 1.31 μm are focused at the connection location 28.

In this way, the distance L11 corresponding to the light having the wavelength of 1.31 μm and the distance L21 corresponding to the light having the wavelength of 1.49 μm can be independently determined relative to each other. Thus, regarding both of the former and latter lights transmitted to the second optical fiber 16, insertion loss corresponding to the above former light and that corresponding to the latter light can be independently determined relative to each other so that a performance of optical wavelength division multiplexing communication can be enhanced.

By increasing or decreasing the distances L11, L12 relative to the respective pitches of the lights having the longer and shorter wavelengths, reflection attenuation amounts of both of the above-stated lights can be independently determined. This also allows a performance of optical wavelength division multiplexing communication to be enhanced.

Second Embodiment of the Optical Reflector

Figure 2:
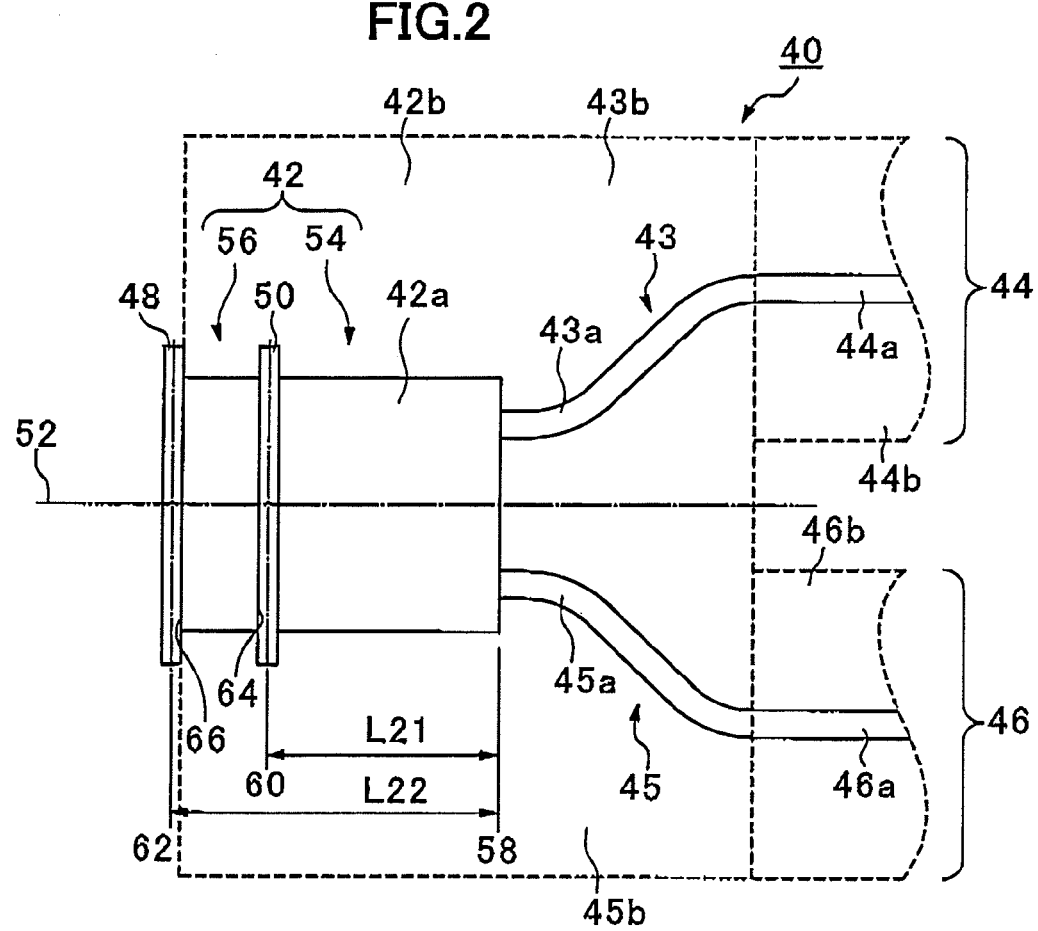
FIG. 2 is a schematic plan view of an MMI (Multi Mode Interference)-type optical reflector which is a second embodiment of the optical reflector according to the present invention.

Next, a second embodiment of the optical reflector according to the present invention will be explained. FIG. 2 is a schematic plan view of an MMI (Multi Mode Interference)-type optical reflector which is a second embodiment of the optical reflector according to the present invention. In this second embodiment, similar to the first embodiment, an exemplary operation in which lights having respective wavelengths of 1.49 μm and 1.31 μm are propagated is explained.

As shown in FIG. 2, an MMI-type optical reflector 40 has a multimode optical waveguide 42 defining an optical propagating region, a first single-mode optical waveguide 43 and a first optical fiber 44 which define first optical input/output means connected to one side of the multimode waveguide 42, a second single-mode optical waveguide 45 and a second optical fiber 46 which define second optical input/output means connected to the one side of the multimode waveguide 42, a mirror 48 provided on the other side of the multimode waveguide 42, and an optical filter 50 in the multimode waveguide 42 between the first and second input/output means 43-46 and the mirror 48.

A plan profile of the multimode waveguide 42 is rectangular. The multimode waveguide 42 has an axis 52 extending in a light-propagating direction parallel to one edge of the rectangular profile. Further, the multimode waveguide 42 has a first optical waveguide section 54 disposed between the first and second single-mode waveguides 43, 45 and the optical filter 50, and a second optical waveguide section 56 disposed between the optical filter 50 and the mirror 48. The multimode waveguide 42 also has a core 42a and a cladding 42b layered on a silicon substrate (not shown), the core 42a and the cladding 42b being preferable made of polymer.

The first and second single-mode waveguides 43, 45 are disposed between the multimode waveguide 42 and the first and second optical fibers 44, 46 so as to meet an optical coupling requirement defined by a positional relationship between the first optical fiber 44 and the second optical fiber 46 and by a profile of the first and second single-mode waveguides 43, 45 appropriately connected to the multimode waveguide 42. Typically, a distance between the first optical fiber 44 and the second optical fiber 46 is equal to or more than 100 μm, while a distance between a connecting location where the first single-mode waveguide 43 is appropriately connected to the multimode waveguide 42 and another connecting location where the second single-mode waveguide 45 is appropriately connected thereto is approximately 10 μm, so that each of the first and second single-mode waveguides 43, 45 can be S-shaped to optically connect the above connecting locations to the respective first and second optical fibers 44, 46. The first and second single-mode waveguides 43, 45 are layered on the silicon substrate (not shown) together with the multimode waveguide 42 and respectively have cores 43a, 45a and claddings 43b, 45b preferably made of polymer.

An optical circuit having a function different from that of the single-mode waveguides 43, 45 may be additionally layered between the first and second single-mode waveguides 43, 45 and the first and second optical fibers 44, 46 for some purpose.

The first and second optical fibers 44, 46 have respective cores 44a, 46a and respective claddings 44b, 46b. Each of the first and second optical fibers 44, 46 is disposed substantially parallel to the axis 52 within a range of ±5 degrees relative thereto and fixed to the substrate with an adhesive.

The optical filter 50 is preferably formed of a dielectric multiple-layer film. In this second embodiment, the optical filter 50 is an SPF (Short wavelength Pass Filter) or a BBF (Band Blocking Filter) which allows a light having a wavelength zone of 1.31 μm to be transmitted therethrough and is reflected a light having a wavelength zone of 1.49 μm. A distance L21 from a connecting location 58, where the first and second single-mode waveguides 43, 45 are connected to the multimode waveguide 42, to an equivalent reflection center plane 60 of the optical filter 50 is preferably a quarter of an interference cycle length of the light having the longer wavelength, i.e., that of 1.49 μm. The optical filter 50 extends in a lateral direction across the axis 52 and the reflection center plane 60 of the filter 50 is preferably within a range of 90+5 degrees relative to the axis 52.

The mirror 48 is preferably formed of a dielectric multiple-layer film, but any material can be used for the mirror 48 if the material can reflect the light having the shorter wavelength, i.e., that of 1.31 μm. For example, the mirror 48 may be formed of an optical filter or a metallic surface. In a case of using a metallic mirror, gold is preferable in view of its reflectance ratio. A distance L22 from the connecting location 58 to an equivalent reflection center plane 62 of the mirror 48 is preferably a quarter of an interference cycle length of the light having the shorter wavelength, i.e., that of 1.31 μm. The reflection center plane 62 of the mirror 48 is preferably within a range of 90±5 degrees relative to the axis 52.

Each of the optical filter 50 and the mirror 48 is preferably fixed to optical filter fixing means which is, for example, a groove 64, or an end or a step 66 provided in the multimode waveguide 42.

Next, an operation of the MMI-type optical reflector 40 which is the second embodiment of the optical reflector according to the present invention will be explained.

When a light having a wavelength of 1.49 μm is input from the first optical fiber 44 to the multimode waveguide 42, the light is reflected at the optical filter 50 to return back and is then transmitted to the second optical fiber 46. Further, when a light having a wavelength of 1.31 μm is input from the first optical fiber 44 to the multimode waveguide 42, the light is transmitted through the optical filter 50, reflected at the mirror 48 to return back, and then transmitted again through the optical filter 50 to the second optical fiber 46. As a result, two lights having respective wavelengths can be transmitted between the first optical fiber 44 and the second optical fiber 46.

Specifically, each of the lights having the respective wavelengths of 1.49 μm and 1.31 μm input from the first optical fiber 44 is then input through the first single-mode waveguide 43 to the multimode waveguide 42 so that each of the lights is converted into a multimode light having modes interfering with each other to cause an interference pattern of a light strength distribution in the multimode waveguide 42. As each of the lights is propagated through the multimode waveguide 42 in the direction of the axis 52, a peak position of the light strength distribution is shifted in the lateral direction relative to the axis 52. In a case where the distance L21 from the connecting location 58 to the reflection center plane 60 of the optical filter 50 is a quarter of an interference cycle length of the light having the longer wavelength, i.e., that of 1.49 μm, when the longer wavelength light is reflected at the optical filter 50 to return back to the connecting location 58, the peak position of the light strength distribution of the longer wavelength light comes to a connecting position between the second single-mode waveguide 45 and the multimode waveguide 42. Further, in a case where the distance L22 from the connecting location 58 to the reflection center plane 62 of the mirror 48 is a quarter of an interference cycle length of the light having the shorter wavelength, i.e., that of 1.31 μm, when the shorter wavelength light is transmitted through the optical filter 50, reflected at the mirror 48 and transmitted again through the optical filter 50 to return back to the connecting location 58, the peak position of the light strength distribution of the shorter wavelength light comes to the connecting position between the second single-mode waveguide 45 and the multimode waveguide 42.

In this way, the distance L21 corresponding to the light having the wavelength of 1.49 μm and the distance L22 corresponding to the light having the wavelength of 1.31 μm can be independently determined relative to each other. Thus, regarding the former and latter lights transmitted to the second optical fiber 46, insertion loss corresponding to the above former light and that corresponding to the latter light can be independently determined relative to each other so that a performance of optical wavelength division multiplexing communication of the optical reflector 40 can be enhanced.

By changing the distances L21, L22, the reflection attenuation amounts of both of the former and latter lights can be independently reduced. This also allows a performance of optical wavelength division multiplexing communication to be enhanced.

Third Embodiment of the Optical Reflector

Figure 3:
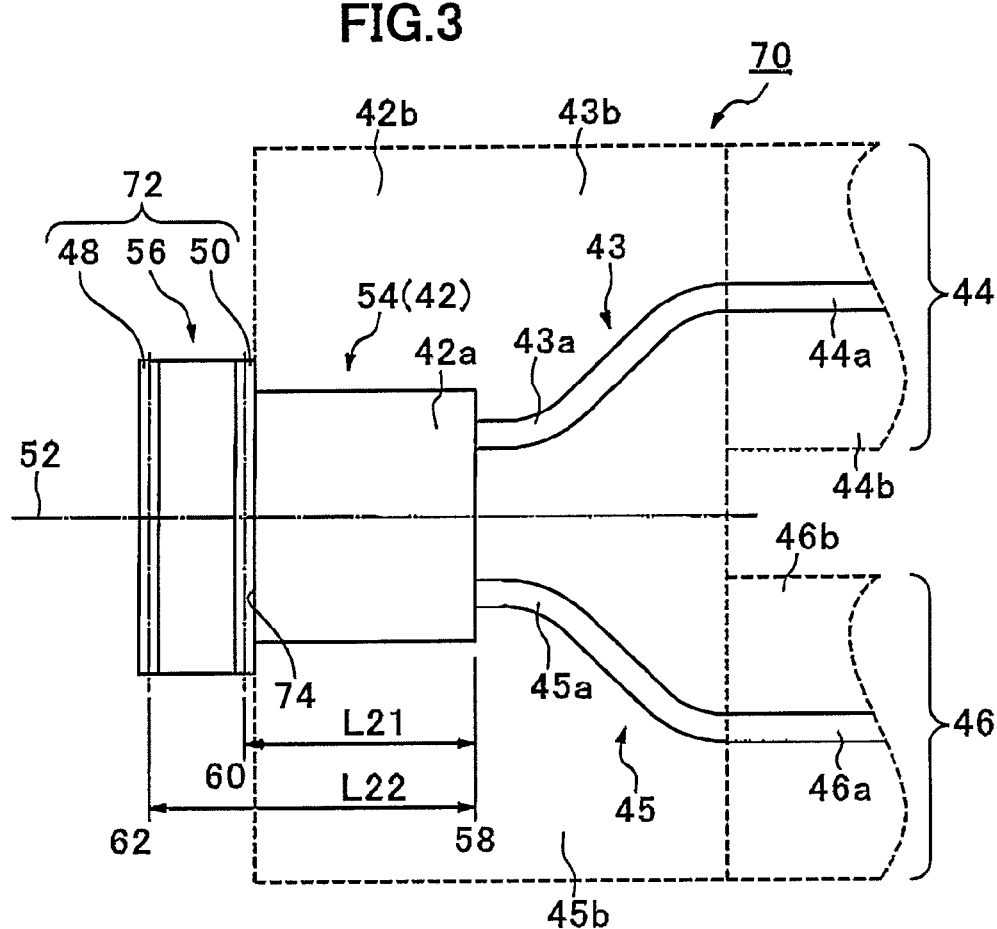
FIG. 3 is a schematic plan view of an MMI (Multi Mode Interference)-type optical reflector which is a third embodiment of the optical reflector according to the present invention.

Next, a third embodiment of the optical reflector according to the present invention will be explained. FIG. 3 is a schematic plan view of an MMI (Multi Mode Interference)-type optical reflector which is a third embodiment of the optical reflector according to the present invention. An MMI-type optical reflector 70 of this third embodiment of the present invention has components similar to those of the second-embodiment MMI-type optical reflector 40, except that the optical filter 50, the mirror 48 and the second optical waveguide section 56 of the second-embodiment MMI-type optical reflector 40 are integrally formed as an optical filter unit 72 in the third-embodiment MMI-type optical reflector, and, instead of the groove 64 or the end or the step 66 in the second embodiment MMI-type optical reflector 40, optical-filter fixing means for receiving the optical filter unit 72 such as an end or a step 74 is provided. In this connection, the same reference numbers are attached to components of the third-embodiment optical reflector 70 similar to the components of the second-embodiment optical reflector 40 as the reference numbers attached to the latter components, and explanations of such similar former components will be omitted.

Further, an operation of the third-embodiment optical reflector 70 is similar to the operation of the second-embodiment optical reflector 40, and thus an explanation of the former operation will be omitted.

The optical filter unit 72 may be formed by adhering the optical filter 50 and the mirror 48 to the second optical waveguide section 56 with an adhesive or a refractive-index adjusting agent. The integral formation of the optical filter unit 72 causes its fixing process to be necessary to be done only once so that a manufacturing cost of the optical reflector 70 can be reduced by virtue of reduction of the number of manufacturing processes. Further, the optical filter unit 72 can be made by layering the optical filter 50 and the mirror 48. In this case, a distance between the optical filter 50 and the mirror 48 can be very accurately controlled. In this way, comparing with the second-embodiment optical reflector 40 in which the optical filter 50 and the mirror 48 are independently fixed to the second optical waveguide section 56, the integral formation of the optical filter unit 72 allows fluctuation of the distance and an angle between the optical filter 50 and the mirror 48 to be reduced.

Fourth Embodiment of the Optical Reflector

Figure 4:
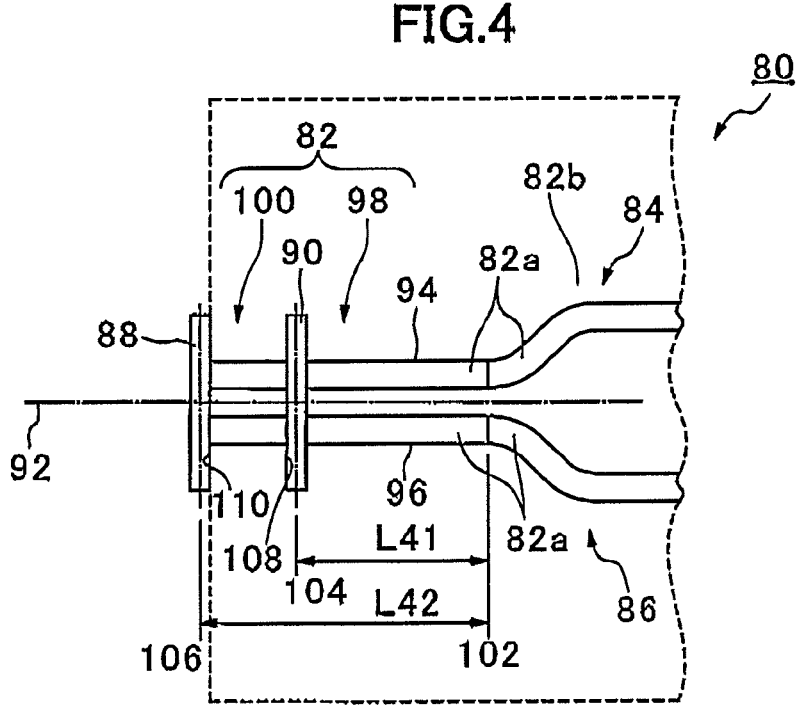
FIG. 4 is a schematic plan view of a directional-coupler-type optical reflector which is a fourth embodiment of the optical reflector according to the present invention.

Next, a fourth embodiment of the optical reflector according to the present invention will be explained. FIG. 4 is a schematic plan view of a directional-coupler-type optical reflector which is a fourth embodiment of the optical reflector according to the present invention. Similar to the first to third embodiments, an exemplary operation in which lights having respective wavelengths of 1.49 μm and 1.31 μm are propagated will be explained.

As shown in FIG. 4, a directional-coupler-type optical reflector 80 has a directional optical coupler 82 defining an optical propagating region, a first optical waveguide 84 defining first optical input/output means connected to one side of the optical coupler 82, a second optical waveguide 86 defining second optical input/output means connected to the one side of the optical coupler 82, a mirror 88 provided on the other side of the optical coupler 82, and an optical filter 90 in the optical coupler 82 between the first and second optical waveguides 84, 86 and the mirror 88.

The optical coupler 82 has an axis 92 extending in a light-propagating direction. Further, the optical coupler 82 has a first optical-coupler path 94 and a second optical-coupler path 96 which are respectively disposed on the opposite sides of and parallel to the axis 92. These optical-coupler paths 94, 96 are defined by a core 82a surrounded by a cladding 82b. Further, these optical-coupler paths 94, 96 are disposed close to each other so that a light transmitted through one of the optical-coupler paths 94 is transferred to the other optical-coupler path 96. The optical coupler paths 94, 96 have a first optical-coupler section 98 disposed between the first and second optical waveguides 84, 86 and the optical filter 90, and a second optical-coupler section 100 disposed between the mirror 88 and the optical filter 90.

Connecting portions between the first and second optical waveguides 84, 86 and the first and second optical-coupler paths 94, 96 are preferably extended substantially parallel to the axis 52 within a range of ±5 degrees relative thereto. As the first and second optical waveguides 84, 86 go away from the optical coupler 82, they become far from each other. A path of each of the first and second optical waveguides 84, 86 may be a curved line, such as a circular arc and a particular sinusoidal function line. The first and second optical waveguides 84, 86 have a core 82a and a cladding 82b layered on a silicon substrate (not shown), the core 82a and the cladding 82b being preferably made of polymer.

The optical filter 90 is preferably formed of a dielectric multiple-layer film. In this fourth embodiment, the optical filter 90 is an SPF (Short wavelength Pass Filter) or a BBF (Band Blocking Filter) which allows a light having a wavelength zone of 1.31 μm to be transmitted therethrough and is reflected a light having a wavelength zone of 1.49 μm. A distance L41 from a connecting location 102, where the first and second waveguides 84, 86 are connected to the optical coupler 82, to an equivalent reflection center plane 104 of the optical filter 90 is preferably half of a coupling length of the light having the longer wavelength, i.e., that of 1.49 μm. Essentially, such a coupling length should be defined by a length including not only straight optical coupler paths 94, 96 close to each other, but also the curved optical waveguides 84, 86 because the coupling length means a length, for example, for which the entire power of light having a certain wavelength and input from the first optical waveguide 84 is coupled to the second optical coupler path 96. However, in FIG. 4, the coupling length is indicated as a length of only the straight optical coupler paths 94, 96 to enable easy-to-understand explanations to be given. The reflection center plane 104 of the filter 90 is preferably within a range of 90±5 degrees relative to the axis 92.

The mirror 88 is preferably formed of a dielectric multiple-layer film, but any material can be used for the mirror 88 if the material can reflect the light having the shorter wavelength, i.e., that of 1.31 μm. For example, the mirror 88 may be formed of an optical filter. A distance L42 from the connecting location 102 to an equivalent reflection center plane 106 of the mirror 88 is preferably half of a coupling length of the light having the shorter wavelength, i.e., that of 1.31 μm. The reflection center plane 106 of the mirror 88 is preferably within a range of 90±5 degrees relative to the axis 92.

Each of the optical filter 90 and the mirror 88 is preferably fixed to optical filter fixing means which is, for example, a groove 108 or an end or a step 110 provided in the optical coupler 82.

Next, an operation of the directional-coupler-type optical reflector 80 which is the fourth embodiment of the optical reflector according to the present invention will be explained.

When a light having a wavelength of 1.49 μm is input from the first waveguide 84 toward the optical coupler 82, the light is reflected at the optical filter 90 to return back and is then transmitted to the second optical waveguide 86. Further, when a light having a wavelength of 1.31 μm is input from the first waveguide 84 toward the optical coupler 82, the light is transmitted through the optical filter 90, reflected at the mirror 88 to return back, and then transmitted through the optical filter 90 again to the second waveguide 86. As a result, the two lights having respective wavelengths can be transmitted between the first waveguide 84 and the second waveguide 86.

Specifically, each of the lights having the respective wavelengths of 1.49 μm and 1.31 μm input from the first waveguide 84 interfere with each other so that the lights transmitted through the first optical-coupling path 94 are transferred to the second optical-coupling path 96 by a coupling length according to respective wavelengths in a case where the distance L41 from the connecting location 102 to the reflection center plane 104 of the optical filter 90 is half of the coupling length of the light having the longer wavelength, i.e., that of 1.49 μm, when the longer-wavelength light is transmitted from the first optical waveguide 84 to the first optical-coupler path 94 and reflected at the optical filter 90 to return back to the connecting location 102, the longer-wavelength light is fully transferred to the second optical-coupler path 96 and then input to the second waveguide 86. Further, in a case where the distance L42 from the connecting location 102 to the reflection center plane 106 of the mirror 88 is half of the coupling length of the light having the shorter wavelength, i.e., that of 1.31 μm, when the shorter-wavelength light is transmitted through the first waveguide 84 to the first optical-coupler path 94 and reflected at the mirror 88 to return back to the connecting location 102, the shorter-wavelength light is fully transferred to the second optical-coupler path 96 and then input to the second waveguide 86.

In this way, the distance L41 corresponding to the light having the wavelength of 1.49 μm and the distance L42 corresponding to the light having the wavelength of 1.31 μm can be independently determined relative to each other. Thus, regarding the former and latter lights transmitted to the second optical waveguide 86, insertion loss corresponding to the former light and that corresponding to the latter light can be independently determined relative to each other so that a performance of optical wavelength division multiplexing communication of the optical reflector 80 can be enhanced.

By changing the distances L41, L42, the reflection attenuation amounts of both of the former and latter lights can be independently reduced. This also allows a performance of optical wavelength division multiplexing communication of the directional-coupler-type optical reflector 80 to be enhanced.

Instead of the above-stated directional-coupler-type optical coupler, an optical-coupler made of a fusion-bond-type optical fiber in which respective sections of two optical fibers are extended and fusion bonded to each other and are inserted thereinto can be used so that the above-stated operation can be performed to dispose the mirror 88 and the optical filter 90.

A Fifth Embodiment of the Optical Reflectors

Figure 5:
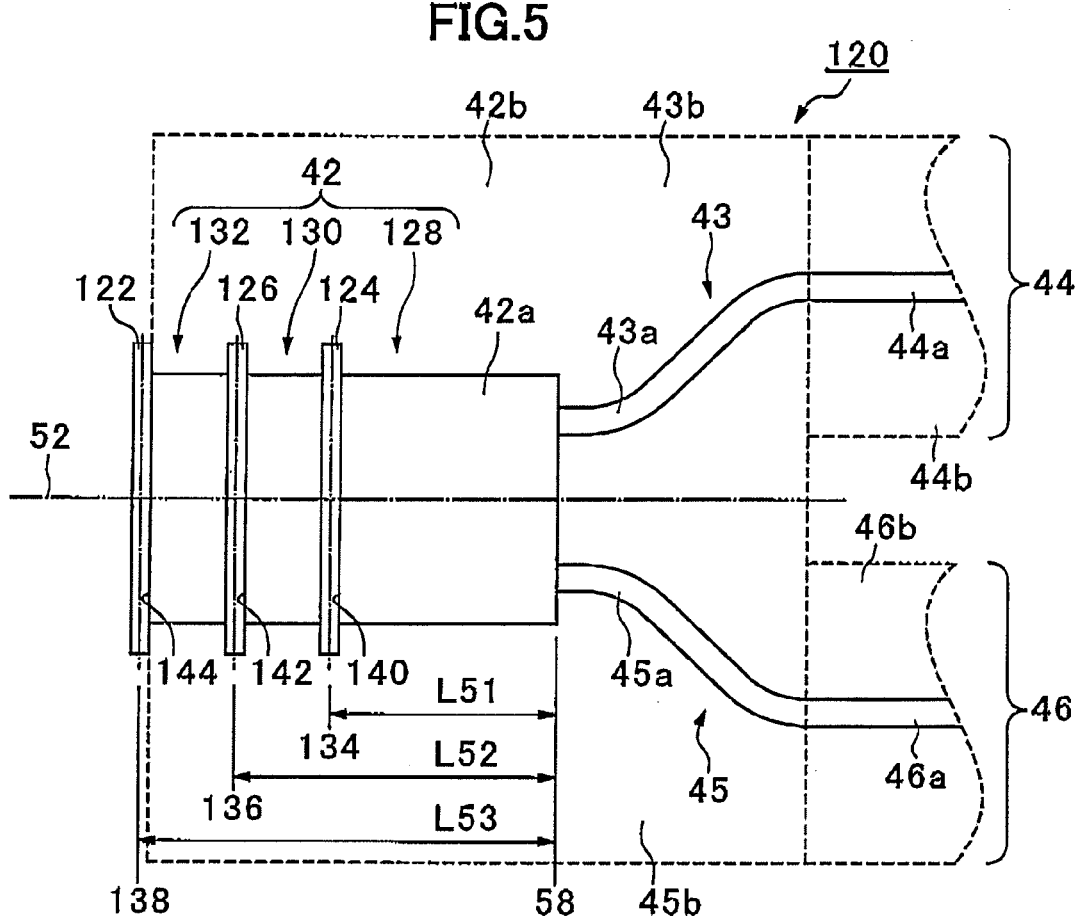
FIG. 5 is a schematic plan view of an MMI (Multi Mode Interference)-type optical reflector which is a fifth embodiment of the optical reflector according to the present invention.

Next, a fifth embodiment of the optical reflector according to the present invention will be explained. FIG. 5 is a schematic plan view of an MMI (Multi Mode Interference)-type optical reflector which is a fifth embodiment of the optical reflector according to the present invention. In this fifth embodiment, three lights having respective wavelengths are propagated instead of the two lights having respective wavelengths in the above first to fourth embodiments. An exemplary operation in which lights having respective wavelengths of 1.55 μm, 1.49 μm and 1.31 μm are propagated will be explained.

A structure of the fifth embodiment of the present invention is similar to that of the second embodiment thereof except that an additional optical filter 126 is provided between the optical filter 50 (124) and the mirror 48 (122) in the fifth-embodiment MMI-type optical reflector 40 (Please refer to FIG. 5), and a revision so that three lights having respective three wavelengths are propagated. In this connection, the same reference numbers are attached to components of the fifth-embodiment optical reflector 120 similar to the components of the second-embodiment optical reflector 40 as the reference numbers attached to the latter components, and explanations of such similar former components will be omitted.

As shown in FIG. 5, an MMI-type optical reflector 120 has a multimode optical waveguide 42 which defines an optical propagating region, a first single-mode optical waveguide 43 and a first optical fiber 44 which define first optical input/output means connected to one side of the multimode waveguide 42, a second single-mode optical waveguide 45 and a second optical fiber 46 which define second optical input/output means connected to the one side of the multimode waveguide 42, a mirror 122 provided on the other side of the multimode waveguide 42, and first and second optical filters 124, 126 in the multimode waveguide 42 between the first and second single-mode waveguides 43, 45 and the mirror 122.

A plan profile of the multimode waveguide 42 is rectangular. The multimode waveguide 42 has an axis 52 extending in a light-propagating direction parallel to one edge of the rectangular profile. Further, the multimode waveguide 42 has a first optical waveguide section 128 disposed between the first and second input/output means 43-46 and the optical filter 124, a second optical waveguide section 130 disposed between the first optical filter 124 and the second optical filter 126, and a third optical waveguide section 132 disposed between the second optical filter 126 and the mirror 122. The multimode waveguide 42 has also a core 42a and a cladding 42b layered on a silicon substrate (not shown), the core 42a and the cladding 42b being preferable made of polymer.

Each of the first and second optical filters 124, 126 is preferably formed of a dielectric multiple-layer film. In this fifth embodiment, the first optical filter 124 is an SPF (Short wavelength Pass Filter) or a BBF (Band Blocking Filter) which allows lights having respective wavelength zones of 1.31 μm and 1.49 μm to be transmitted therethrough and is reflected a light having a wavelength zone of 1.55 μm. The second optical filter 126 is an SPF (Short wavelength Pass Filter) or a BBF (Band Blocking Filter) which allows a light having a wavelength zone of 1.31 μm to be transmitted therethrough and is reflected a light having a wavelength zone of 1.49 μm. Namely, the second optical filter 126 is reflected the light having the wavelength zone of 1.49 μm transmitted through the optical filter 124 positioned on a side of the optical input/output means 43-46 relative to the second optical filter 126. A distance L51 from the connecting location 58, where the first and second single-mode waveguides 43, 45 are connected to the multimode waveguide 42, to an equivalent reflection center plane 134 of the first optical filter 124 is preferably half of a interference-cycle length of the light having the longest wavelength, i.e., that of 1.55 μm. Further, a distance L52 from the connecting location 58 to an equivalent reflection center plane 136 of the second optical filter 126 is preferably half of a interference-cycle length of the light having the intermediate wavelength, i.e., that of 1.49 μm. The reflection center planes 134, 136 of the first and second filters 124, 126 are preferably within a range of 90±5 degrees relative to the axis 52.

The mirror 122 is preferably formed of a dielectric multiple-layer film, but any material can be used for the mirror 122 if the material can reflect the light having the shortest wavelength, i.e., that of 1.31 μm. For example, the mirror 122 may be formed of an optical filter. A distance L53 from the connecting location 58 to an equivalent reflection center plane 138 of the mirror 48 is preferably half of a interference-cycle length of the light having the shortest wavelength, i.e., that of 1.31 μm. The reflection center plane 138 of the mirror 122 is preferably within a range of 90±5 degrees relative to the axis 52.

Each of the first and second optical filters 124, 126 and the mirror 122 is preferably fixed to grooves 140, 142 or an end or a step 144 provided in the multimode waveguide 42, each of which defines optical filter fixing means.

Next, an operation of the MMI-type optical reflector which is the fifth embodiment of the optical reflector according to the present invention will be explained.

When a light having a wavelength of 1.55 μm is input from the first optical fiber 44 to the multimode waveguide 42, the light is reflected at the first optical filter 124 to return back and is then transmitted to the second optical fiber 46. Further, when a light having a wavelength of 1.49 μm is input from the first optical fiber 44 to the multimode waveguide 42, the light is transmitted through the first optical filter 124, reflected at the second filter 126 to return back, then transmitted through the first optical filter 126 again, and transmitted to the second optical fiber 46. Further, when a light having a wavelength of 1.31 μm is input from the first optical fiber 44 to the multimode waveguide 42, the light is transmitted through the first and second optical filters 124, 126, reflected at the mirror 122 to return back, then transmitted through the first and second optical filters 124, 126 again, and transmitted to the second optical fiber 46. As a result, the three lights having respective wavelengths can be transmitted between the first optical fiber 44 and the second optical fiber 46. The details of operation of the fifth-embodiment optical reflector 120 are similar to those of the second-embodiment optical reflector 40 and thus explanations of the details of the former operation will be omitted.

In the above-stated MMI-type optical reflector 120, the distances L51, L52, L53 respectively corresponding to the lights having the wavelengths of 1.55 μm, 1.49 μm and 1.31 μm can be independently determined relative to each other. Thus, profiles (widths and lengths) of the respective cores of the first, second and third optical waveguide sections 128, 130, 132 can be determined so that insertion loss corresponding to each of the above-stated three lights can be minimized. This allows a performance of optical wavelength division multiplexing communication to be enhanced.

In the above-stated first to fifth embodiments, although each of their operations has been explained, namely, two or three lights having respective wavelengths are input from the first optical fiber 14, 44 and output to the second optical fiber 16, 46, another operation may be done so that one or two of the above-stated light(s) is/are input from the second optical fiber 16, 46 and output to the first optical fiber 14, 44.

Further, each of the first-to-fifth-embodiment optical reflectors can be used as a connecting device for allowing a signal transmitted through one of two optical fibers disposed side-by-side to be transmitted to the other optical fiber. Conventionally, in order to connect such two fibers to each other, other connecting optical fibers for connecting such fibers have been used. However, since a radius of curvature of the connecting fiber cannot be reduced more than a certain amount due to its structure, a large space is required for such connecting fibers. On the other hand, in the optical reflector according to the present invention, the above-stated two fibers can be connected to each other in a small space.

Alternatively, an optical power monitor for detecting an optical power of a light having a predetermined wavelength among lights transmitted between the first input/output means 14, 43, 44, 84 and the second input/output means 16, 45, 46, 86 can be made by replacing the optical filters and the mirror with BBFs (Band Blocking Filters) for reflecting respective lights having respective wavelengths so that only a reflecting rate of the light having the predetermined wavelength is less than 100%, and providing an output optical fiber or an output optical receiving element on the opposite side of the light-propagating region relative to the BBF replaced with the mirror.

First Embodiment of the Optical Multiplexer/Demultiplexer Device

Figure 6:
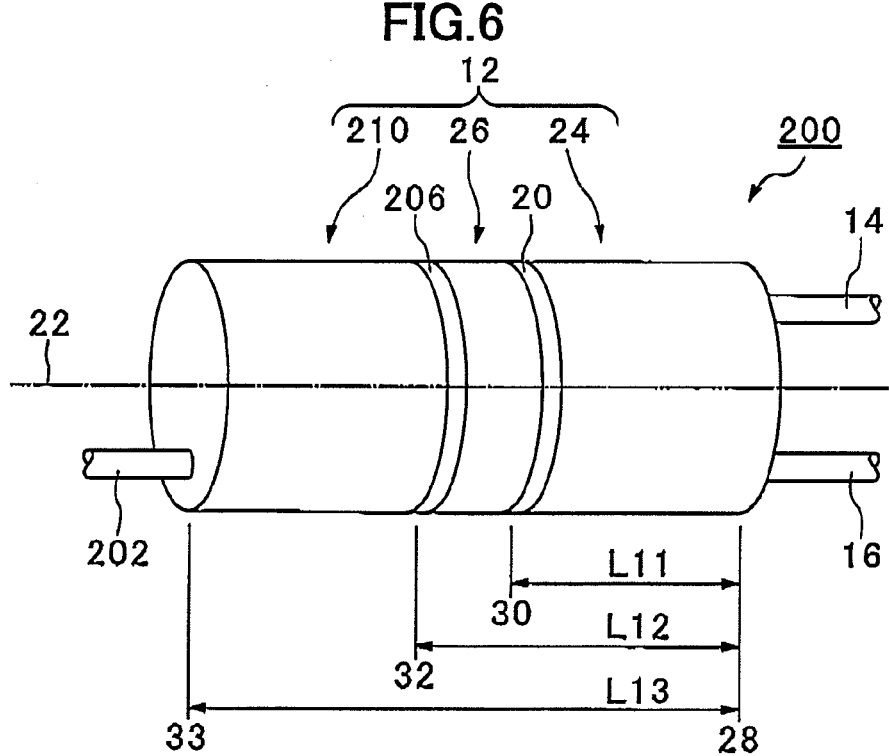
FIG. 6 is a schematic plan view of a rod-lens-type optical reflector which is a first embodiment of the optical multiplexer/demultiplexer device according to the present invention.

Next, a first embodiment of the optical multiplexer/demultiplexer device according to the present invention will be explained. FIG. 6 is a schematic plan view of a rod-lens-type optical reflector which is a first embodiment of the optical multiplexer/demultiplexer device according to the present invention. In this embodiment, an exemplary operation in which lights having respective wavelengths of 1.55 μm, 1.49 μm and 1.31 μm are propagated will be explained.

An optical multiplexer/demultiplexer device of the first embodiment of the optical multiplexer/demultiplexer device according to the present invention has components similar to those of the optical reflector 10 of the first-embodiment optical reflector, except that the mirror 18 of the first-embodiment rod-lens-type optical reflector 10 is replaced with a second filter 206 shown in FIG. 6, the rod lends 12 is extended beyond the second optical filter 206, and third input/output means 222 shown in FIG. 6 is additionally connected to the extended rod lens 12. In this connection, the same reference numbers are attached to components of the first-embodiment optical multiplexer/demultiplexer device 200 similar to the components of the first-embodiment optical reflector 10 as the reference numbers attached to the latter components, and explanations of such similar former components will be omitted.

As shown in FIG. 6, a rod-lens type optical multiplexer/demultiplexer device 200 has a rod lens 12 which defines an optical propagating region, a first optical fiber 14 which defines first optical input/output means connected to one side of the rod lens 12, a second optical fiber 16 which defines second optical input/output means connected to the one side of the rod lens 12, a third optical fiber 202 which defines third optical input/output means provided on the other side of the rod lens 12, and first and second optical filters 204, 206 disposed in the rod lens 12 between the first and second optical fibers 14, 16 and the third optical filter 202.

The rod lens 12 includes a first rod lens section 24 disposed between the first and second optical fibers 14,16 and the first optical filter 20, a second rod lens section 26 disposed between the first optical filter 20 and the second optical filter 206, and a third rod lens section 210 disposed between the second optical filter 206 and the third optical fiber 202. When a distance L13 from the connecting location 28 between the first and second optical fibers 14, 16 and the first rod lens section 24 to a connecting location 33 between the third rod lens section 210 and the third optical fiber 202 is half of a pitch of a light to be propagated, a beam of the light input from the first optical fiber 14 is focused at the end 34 of the rod lens 12 and output to the third optical fiber 202.

Each of the first and second optical filters 20, 206 is preferably formed of a dielectric multiple-layer film. In this embodiment, the first optical filter 20 is a LPF (Long wavelength Pass Filter) allowing lights having respective wavelength zones of 1.55 μm and 1.49 μm to be transmitted therethrough and reflecting a light having a wavelength zone of 1.31 μm. The second optical filter 206 is a LPF allowing a light having a wavelength zone of 1.55 μm to be transmitted therethrough and reflecting a light having a wavelength zone of 1.49 μm.

Next, an operation of the rod-lens-type optical multiplexer/demultiplexer device which is the first embodiment of the optical multiplexer/demultiplexer device according to the present invention will be explained.

An operation of the first-embodiment rod-lens-type optical multiplexer/demultiplexer device 200 is similar to that of the first-embodiment rod-lens-type optical reflector 10, except that a light having a wavelength of 1.55 μm is input through the first optical fiber 14 into the rod lens 12, transmitted through the first and second optical filters 20, 206 to the third optical fiber 202, and a light having a wavelength of 1.49 μm is reflected at the second optical filter 206 instead of the mirror 18. Thus, an explanation of the former operation is omitted. In this case, a light is additionally transmitted between one of the first and second optical fibers 14,16, and the third optical fiber 202.

In the above rod-lens-type optical multiplexer/demultiplexer device 200, the distance L13 corresponding to the light having the wavelength of 1.55 μm, the distance L12 corresponding to the light having the wavelength of 1.49 μm, and the distance L13 corresponding to the light having the wavelength of 1.31 μm can be independently determined relative to each other. Thus, configurations (diameters and lengths) of the first, second and third rod lens sections 24, 26, 210 can be independently determined so that insertion loss corresponding to each of the above-stated three lights can be minimized. This allows a performance of optical wavelength division multiplexing communication to be enhanced.

The optical multiplexer/demultiplexer device may be used for a system in which optical signals having respective wavelengths of 1.31 μm and 1.49 μm are bidirectionally transmitted and an optical signal having wavelength of 1.55 μm is additionally transmitted in a wavelength division multiplexing form. When lights having respective wavelengths of 1.55 μm and 1.49 μm are input through the first optical fiber 14 and a light having a wavelength of 1.31 μm is input through the second optical fiber 16, the light having the wavelength of 1.31 μm is output from the first optical fiber 14, the light having the wavelength of 1.49 μm is output from the second optical fiber 16, and the light having the wavelength of 1.55 μm is output from the third optical fiber 202, namely, the device 200 in the above-stated system is used as an optical splitter. When each of these lights is transmitted in the reverse direction, the device 200 in the above-stated system is used as an optical coupler. When such an optical coupler is disposed in an office for subscribers and such an optical splitter is disposed in a house, a FTTH (Fiber To The Home) system for three-wavelength communication can be obtained. Under the ITU-T (International Telecommunication Union—Telecommunication standardization sector) standard, a light having a wavelength of 1.31 μm is assigned for an up-data signal, a light having a wavelength of 1.49 μm is assigned for a down-data signal, and a light having a wavelength of 1.55 μm is assigned for a down-video signal. Thus, the above-stated system meets the international standard.

Second Embodiment of the Optical Multiplexer/demultiplexer Device

Next, a second embodiment of the optical multiplexer/demultiplexer device according to the present invention will be explained. FIG. 7 is a schematic plan view of an MMI-type optical multiplexer/demultiplexer device which is a second embodiment of the optical multiplexer/demultiplexer device according to the present invention. In this embodiment, an exemplary operation is explained in which lights having respective wavelengths of 1.55 μm, 1.49 μm and 1.31 μm are propagated.

A second-embodiment optical multiplexer/demultiplexer device 220 according to the present invention has components similar to those of the second-embodiment optical reflector 40, except that the mirror 48 of the second-embodiment MMI-type optical reflector 40 is replaced with a second filter 226 shown in FIG. 7, the optical propagating region is extended beyond the second optical filter 226, and third input/output means 221, 222 shown in FIG. 7 is additionally connected to the extended optical propagating region. In this connection, the same reference numbers are attached to components of the second-embodiment optical multiplexer/demultiplexer device 220 similar to the components of the second-embodiment optical reflector 40 as the reference numbers attached to the latter components, and explanations of such similar former components will be omitted.

As shown in FIG. 7, an MMI-type optical multiplexer/demultiplexer device 220 has a multimode optical waveguide 42 which is an optical propagating region, a first single-mode optical waveguide 43 and a first optical fiber 44 which define first optical input/output means connected to one side of the multimode waveguide 42, a second single-mode optical waveguide 45 and a second optical fiber 46 which define second optical input/output means connected to the one side of the multimode waveguide 42, a third single-mode optical waveguide 221 and a third optical fiber 222 which define third optical input/output means connected to the other side of the multimode waveguide 42, and first and second optical filters 224, 226 in the multimode waveguide 42 between the first and second input/output means 43-46 and the third input/output means 221, 222.

The multimode waveguide 42 has a first optical waveguide section 54 disposed between the first and second single-mode waveguides 43, 45 and the first optical filter 224, a second optical waveguide section 56 disposed between the first optical filter 224 and the second optical filter 226, and a third optical waveguide section 230 disposed between the second optical filter 226 and the third single-mode waveguide 221.

A distance L23 from the connecting location 58, where the first and second single-mode waveguides 43, 45 are connected to the multimode waveguide 42, to a connecting location 63, where the third single-mode waveguides 221 is connected to the multimode waveguide 42 is preferably half of a interference cycle or length of the light to be transmitted, for example, light having a wavelength of 1.55 μm.

The third single-mode waveguide 221 has a core 221a and a cladding 221b layered on the silicon substrate (not shown) together with the multimode waveguide 42, the core 221a and the cladding 221b being preferably made of polymer.

The third optical fiber 222 has a core 222a and a cladding 222b. The third optical fiber 222 is disposed substantially parallel to the axis 52 within a range of ±5 degrees relative thereto and fixed to the third single-mode waveguide 221 with an adhesive.

The third single-mode waveguide 221 may be omitted and thus the third optical fiber 222 may be directly connected to the multimode waveguide section 230. The word "connect" used in the present specification means that optical connection is appropriately obtained and, concretely, other materials such as an adhesive, a refractive index conditioned agent, a filler and an antireflection film may intervene between any two of optical elements such as an optical fiber, an optical single-mode waveguide, an optical multimode waveguide and an optical filter. Spatial connection in which a space intervenes therebetween is also allowed.

Each of the first and second optical filters 224, 226 is preferably formed of a dielectric multiple-layer film. In this embodiment, the first optical filter 224 is a BBF (Band Blocking Filter) which allows a light having a wavelength zone of 1.31 μm to be transmitted therethrough and is reflected a light having a wavelength zone of 1.49 μm. The second optical filter 226 is a LPF (Long wavelength Pass Filter) which allows a light having a wavelength zone of 1.55 μm to be transmitted therethrough and is reflected a light having a wavelength zone of 1.31 μm. The second optical filter 226 is preferably fixed to the groove 66, as in the case of the first optical filter 224.

Next, an operation of the MMI-type optical multiplexer/demultiplexer device which is the second embodiment of the optical multiplexer/demultiplexer device according to the present invention will be explained.

An operation of the second-embodiment MMI-type optical multiplexer/demultiplexer device 220 is similar to that of the second-embodiment optical reflector 40, except that a light having a wavelength of 1.55 μm is input through the first optical fiber 44 and the first single-mode waveguide 43 into the multimode waveguide 42, transmitted through the first and second optical filters 224, 226, and the mirror 48 and the optical filter 50 shown in FIG. 2 are respectively replaced with the second optical filter 226 and the first optical filter 224. Thus, an explanation of the former operation is omitted. In this case, a light is additionally transmitted between one of the first and second optical fibers 44,46, and the third optical fiber 222.

The MMI-type optical multiplexer/demultiplexer device 220 can be applied to a use similar to that which the optical multiplexer/demultiplexer device 200 is applied to by operating the former multiplexer/demultiplexer device in a way similar to that of the latter multiplexer/demultiplexer device 200.

In the second-embodiment MMI-type optical multiplexer/demultiplexer device 220, the distances L23, L21, L22 respectively corresponding to the lights having the wavelengths of 1.55 μm, 1.49 μm and 1.31 μm can be independently determined relative to each other. Thus, profiles (widths and lengths) of the respective cores 42a of the first, second and third multimode waveguide sections 54, 56, 230 can be determined so that insertion loss corresponding to each of the above three lights can be minimized. This allows a performance of optical wavelength division multiplexing communication to be enhanced.

Third Embodiment of the Optical Multiplexer/demultiplexer Device

Next, a third embodiment of the optical multiplexer/demultiplexer device according to the present invention will be explained. FIG. 8 is a schematic plan view of an MMI (Multi Mode Interference)-type optical multiplexer/demultiplexer device which is a third embodiment of the optical multiplexer/demultiplexer device according to the present invention. A third-embodiment MMI-type optical multiplexer/demultiplexer device 240 has components similar to those of the second-embodiment MMI-type optical multiplexer/demultiplexer device 220, except that the first and second optical filters 224, 226 and the second optical waveguide section 56 of the second-embodiment MMI-type optical multiplexer/demultiplexer device 220 are integrally formed as an optical filter unit 242, and, instead of the groove 64 and the step 66 of the second embodiment, optical filter fixing means, namely, an groove 244 for receiving the optical filter unit 242 is provided. In this connection, the same reference numbers are attached to components of the third-embodiment optical multiplexer/demultiplexer device 240 similar to the components of the second-embodiment optical multiplexer/demultiplexer device 220 as the reference numbers attached to the latter components, and explanations of such similar former components will be omitted.

Further, an operation of the third-embodiment optical multiplexer/demultiplexer device 240 is similar to that of the second-embodiment optical multiplexer/demultiplexer device 220, and thus an explanation of the former operation will be omitted.

The third-embodiment MMI-type optical multiplexer/demultiplexer device 240 can be applied to a use similar to that which the second-embodiment MMI-type optical multiplexer/demultiplexer device 220 is applied to by operating the former multiplexer/demultiplexer device in a way similar to that of the latter multiplexer/demultiplexer device.

In the above-stated third-embodiment MMI-type optical multiplexer/demultiplexer device 240, the distances L23, L21, L22 respectively corresponding to the lights having the wavelengths of 1.55 µm, 1.49 µm and 1.31 µm can be independently determined relative to each other. Thus, profiles (widths and lengths) of the respective cores 42a of the first, second and third multimode waveguide sections 54, 56, 230 can be determined so that insertion loss corresponding to each of the above three lights can be minimized. This allows a performance of optical wavelength division multiplexing communication to be enhanced.

Fourth Embodiment of the Optical Multiplexer/demultiplexer Device

Next, a fourth embodiment of the optical multiplexer/demultiplexer device according to the present invention will be explained. FIG. 9 is a schematic plan view of a directional-coupler-type optical multiplexer/demultiplexer device which is a fourth embodiment of the optical multiplexer/demultiplexer device according to the present invention. In this embodiment, an exemplary operation is explained in which lights having respective wavelengths of 1.55 µm, 1.49 µm and 1.31 µm are propagated.

A fourth-embodiment directional-coupler-type optical multiplexer/demultiplexer device 260 has components similar to those of the fourth-embodiment directional-coupler-type optical reflector 80, except that the mirror 88 of the fourth-embodiment directional-coupler-type optical reflector 80 is replaced with a second filter 268 shown in FIG. 9, the optical coupler 82 is extended beyond the second optical filter 268, and third and fourth optical waveguide 262, 264 shown in FIG. 9 are added to the extended optical coupler 82. In this connection, the same reference numbers are attached to components of the fourth-embodiment optical multiplexer/demultiplexer device 260 similar to the components of the fourth-embodiment optical reflector 80 as the reference numbers attached to the latter components, and explanations of such similar former components will be omitted.

As shown in FIG. 9, a fourth-embodiment directional-coupler-type optical multiplexer/demultiplexer device 260 has a directional optical coupler 82 which defines an optical propagating region, a first optical waveguide 84 defining first optical input/output means connected to one side of the optical coupler 82, a second optical waveguide 86 defining second optical input/output means connected to the one side of the optical coupler 82, a third optical waveguide 262 defining third optical input/output means connected to the other side of the optical coupler 82, a fourth optical waveguide 264 connected to the other side of the optical coupler 82, and first and second optical filters 266, 268 in the optical coupler 82 between the first and second optical waveguides 84, 86 and the third and fourth optical waveguides 262, 264. The first optical coupler path 94 is connected to the first and fourth optical waveguides 84, 264, and the second optical coupler path 96 is connected to the second and third optical waveguides 86, 262.

The optical coupler 82 has a first optical-coupler section 98 disposed between the first and second optical waveguides 84, 86 and the first optical filter 266, and a second optical-coupler section 100 disposed between the first optical filter 266 and the second optical filter 268, and a third optical-coupler section 270 disposed between the second optical filter 268 and the third and fourth optical waveguides 262, 264. A distance L43 from the connecting location 102 between the first and second optical waveguides 84, 86 and the optical coupler 82, to a connecting location 107 between the third and fourth optical waveguides 262, 264 and the optical coupler 82 is preferably a coupling length of a light having a wavelength so that the light is transmitted through the both of the optical filters and, for example, such a wavelength is 1.55 µm.

The third and fourth optical waveguides 262, 264 have a core 82a and a cladding 82b integrally layered on a silicon substrate (not shown) together with the optical coupler 82.

Each of the first and second optical filters 266, 268 is preferably formed of a dielectric multiple-layer film. In this embodiment, the first optical filter 266 is a BBF (Band Blocking Filter) which allows lights having respective wavelength zones of 1.31 µm and 1.55 µm to be transmitted therethrough and is reflected a light having a wavelength zone of 1.49 µm. The second optical filter 268 is a LPF (Long wavelength Pass Filter) which allows a light having a wavelength zone of 1.55 to be transmitted therethrough and is reflected a light having a wavelength zone of 1.31 µm.

Next, an operation of the fourth-embodiment directional-coupler-type optical multiplexer/demultiplexer device 260 will be explained.

An operation of the fourth-embodiment directional-coupler-type optical multiplexer/demultiplexer device 260 is similar to that of the fourth-embodiment optical reflector 80, except that a light having a wavelength of 1.55 µm is input through the first optical waveguide 84 into the optical coupler 82, and then transmitted through the first and second optical filter 266, 268 and the third optical waveguide 262, and the mirror 88 and the optical filter 90 shown in FIG. 4 are respectively replaced with the second optical filter 268 and the first optical filter 266. Thus, an explanation of the former operation is omitted. In this case, a light is additionally transmitted between one of the first and second optical waveguides 84,86, and the third optical waveguide 262.

The fourth-embodiment directional-coupler-type optical multiplexer/demultiplexer device 260 can be applied to a use similar to that which the first-embodiment optical multiplexer/demultiplexer device 200 is applied to by operating the former multiplexer/demultiplexer device in a way similar to that of the latter multiplexer/demultiplexer device.

In the fourth-embodiment directional-coupler-type optical multiplexer/demultiplexer device 260, the distance L43 corresponding to the light having the wavelength of 1.55 µm, the distance L41 corresponding to the light having the wavelength of 1.49 µm, and the distance L42 corresponding to the light having the wavelength of 1.31 µm can be independently determined relative to each other. Thus, configurations (widths and lengths) of the first, second and third optical coupler sections 98, 100, 270 can be independently determined so that insertion loss corresponding to each of the above-stated three lights can be minimized. This allows a performance of optical wavelength division multiplexing communication to be enhanced.

Although the above-stated optical coupler 82 is an optical-waveguide-type optical directional coupler, instead of the optical coupler 82, an optical coupler portion of fusion-bond-type optical fibers in which respective portions of the two optical fibers are extended and fusion bonded to each other and into which the two optical filters are inserted can be used so that the above-stated operation can also be obtained.

Fifth Embodiment of the Optical Multiplexer/demultiplexer Devices

Next, a fifth embodiment of the optical multiplexer/demultiplexer device according to the present invention will be explained. FIG. 10 is a schematic plan view of an MMI-type optical multiplexer/demultiplexer device which is a second embodiment of the optical multiplexer/demultiplexer device according to the present invention. In this embodiment, an exemplary operation is explained in which lights having respective wavelengths of 1.65 μm, 1.55 μm, 1.49 μm and 1.31 μm are propagated.

An optical multiplexer/demultiplexer device 280 of the fifth embodiment of the optical multiplexer/demultiplexer device according to the present invention has components similar to those of the fifth-embodiment MMI-type optical reflector 120, except that the mirror 122 of the fifth-embodiment MMI-type optical reflector 120 is replaced with a third optical filter 288 shown in FIG. 10, the optical propagating region is extended beyond the third optical filter 288, and third input/output means 281, 282 shown in FIG. 10 is additionally connected to the extended optical propagating region. In this connection, the same reference numbers are attached to components of the fifth-embodiment optical multiplexer/demultiplexer device 280 similar to the components of the fifth-embodiment optical reflector 120 as the reference numbers attached to the latter components, and explanations of such similar former components will be omitted.

As shown in FIG. 10, an MMI-type optical multiplexer/demultiplexer device 280 has a multimode optical waveguide 42 which defines an optical propagating region, a first single-mode optical waveguide 43 and a first optical fiber 44 which define first optical input/output means connected to one side of the multimode waveguide 42, a second single-mode optical waveguide 45 and a second optical fiber 46 which define second optical input/output means connected to the one side of the multimode waveguide 42, a third single-mode optical waveguide 281 and a third optical fiber 282 which define third optical input/output means connected to the other side of the multimode waveguide 42, and first, second and third optical filters 284, 286, 288 in the multimode waveguide 42 between the first and second input/output means 43-46 and the third input/output means 281, 282.

The multimode waveguide 42 has a first optical waveguide section 128 disposed between the first and second single-mode waveguides 43, 45 and the first optical filter 284, a second optical waveguide section 130 disposed between the first optical filter 284 and the second optical filter 286, a third optical waveguide section 132 disposed between the second optical filter 286 and the third optical filter 288, and a fourth optical waveguide section 290 disposed between the third optical filter 288 and the third single-mode waveguide 281.

A distance L54 from the connecting location 58, where the first and second single-mode waveguides 43, 45 are connected to the multimode waveguide 42, to a connecting location 139, where the third single-mode waveguide 281 is connected to the multimode waveguide 42 is preferably half of an interference cycle or length of the light to be transmitted; for example, light having a wavelength of 1.65 μm.

The third single-mode waveguide 281 has a core 281a and a cladding 281b layered on the silicon substrate (not shown) together with the multimode waveguide 42, the core 281a and the cladding 281b being preferably made of polymer.

The third optical fiber 282 has a core 282a and a cladding 282b. The third optical fiber 282 is disposed substantially parallel to the axis 52 (within a range of ±5 degrees relative thereto) and fixed to the third single-mode waveguide 281 with an adhesive.

The third single-mode waveguide 281 may be omitted and thus the third optical fiber 282 may be directly connected to the fourth multimode waveguide section 290. The word "connect" used in the present specification means that optical connection is appropriately obtained and, concretely, other material such as an adhesive, a refractive index conditioned agent, a filler and an antireflection film may intervene any two of optical elements such as an optical fiber, an optical single-mode waveguide, an optical multimode waveguide and an optical filter. Spatial connection in which a space intervenes therebetween is also allowed.

Each of the first, second and third optical filters 284, 286, 288 is preferably formed of a dielectric multiple-layer film. In this embodiment, the first optical filter 284 is a BBF (Band Blocking Filter) which allows lights having respective wavelength zones of 1.65 μm, 1.49 μm, 1.31 μm to be transmitted therethrough and is reflected a light having a wavelength zone of 1.55 μm. The second optical filter 286 is a BBF (Band Blocking Filter) which allows lights having respective wavelength zones of 1.65 μm and 1.31 μm to be transmitted therethrough and is reflected a light having a wavelength zone of 1.49 μm. The third optical filter 288 is a LPF (Long wavelength Pass Filter) which allows a light having a wavelength zone of 1.65 μm to be transmitted therethrough and is reflected a light having a wavelength zone of 1.31 μm. The third optical filter 288 is preferably fixed to the groove 144.

Next, an operation of the MMI-type optical multiplexer/demultiplexer device which is the fifth embodiment of the optical multiplexer/demultiplexer device according to the present invention will be explained.

An operation of the fifth-embodiment MMI-type optical multiplexer/demultiplexer device 280 is similar to that of the fifth-embodiment optical reflector 120, except that a light having a wavelength of 1.65 μm is input through the first optical fiber 44 and the first single-mode waveguide 43 into the multimode waveguide 42, and then transmitted through the first, second and third optical filters 284, 286, 288 and the third single-mode optical waveguide 281 to the third optical fiber 282, and the mirror 122 and the optical filters 124, 126 shown in FIG. 5 are respectively replaced with the optical filters 284, 286, 288. Thus, an explanation of the former operation is omitted. In this case, a light is additionally transmitted between one of the first and second optical fibers 44, 46, and the third optical fiber 282.

In the fifth-embodiment MMI-type optical multiplexer/demultiplexer device 280, the distances L54, L51, L52, L53 respectively corresponding to the lights having the wavelengths of 1.65 μm, 1.55 μm, 1.49 μm and 1.31 μm can be independently determined relative to each other. Thus, profiles (widths and lengths) of the respective cores of the first, second, third and fourth multimode waveguide sections 128, 130, 132, 290 can be determined so that insertion loss corresponding to each of the above-stated four lights can be minimized. This allows a performance of optical wavelength division multiplexing communication of the fifth-embodiment MMI-type optical multiplexer/demultiplexer device 280 to be enhanced.

Sixth Embodiment of the Optical Multiplexer/demultiplexer Device

Next, a sixth embodiment of the optical multiplexer/demultiplexer device according to the present invention will be explained. FIG. 11 is a schematic plan view of an MMI-type optical multiplexer/demultiplexer device which is a sixth embodiment of the optical multiplexer/demultiplexer device according to the present invention. An MMI-type optical multiplexer/demultiplexer device 300 which is a sixth embodiment of the optical multiplexer/demultiplexer device according to the present invention has almost the same structure as that of the second-embodiment MMI-type optical multiplexer/demultiplexer device 220, but there is a difference between them in that in the device 300 the first optical waveguide section 54 is shifted relative to the other waveguide sections 56, 230 in a direction perpendicular to the optical propagating direction. Specifically, an axis 54a of the first multimode optical waveguide section 54 is laterally offset relative to an axis 52 of the other multimode waveguide sections 56, 230 toward a side of the first single-mode optical waveguide 43 by a distance D0. In this connection, the same reference numbers are attached to components of the sixth-embodiment optical multiplexer/demultiplexer device 300 similar to the components of the second-embodiment optical multiplexer/demultiplexer device 220 as the reference numbers attached to the latter components, and explanation of such similar former components will be omitted.

In FIG. 11, widths of the first, second and third multimode optical waveguide sections 54, 56, 230 are respectively indicated by symbols W1, W2, W3, distances in the width direction between the respective axes of the first, second and third single-mode optical waveguides 43, 45, 221 and the axis 52 of the second and third multimode optical waveguide sections 56, 230 at respective connecting locations where the respective first, second and third single-mode optical waveguides 43, 45, 221 are connected to the multimode waveguide sections 42 are respectively indicated by symbols D1, D2, D3, and widths of the first, second and third single-mode optical waveguides 43, 45, 221 at the above respective connecting locations are respectively indicated by symbols WS1, WS2, WS3.

Further, an operation of the sixth-embodiment optical multiplexer/demultiplexer device 300 is similar to that of the second-embodiment optical multiplexer/demultiplexer device 220, and thus an explanation of the former operation will be omitted.

Seventh Embodiment of the Optical Multiplexer/Demultiplexer Device

Next, a seventh embodiment of the optical multiplexer/demultiplexer device according to the present invention will be explained. FIG. 12 is a schematic plan view of a directional-coupler-type optical multiplexer/demultiplexer device which is a seventh embodiment of the optical multiplexer/demultiplexer device according to the present invention. A seventh-embodiment directional-coupler-type optical multiplexer/demultiplexer device 310 has almost the same structure as that of the fourth-embodiment directional-coupler-type optical multiplexer/demultiplexer device 260, but there is a difference between them in that the first optical coupler section 98 in the device 310 is shifted relative to the other optical coupler sections 100, 270 in a direction perpendicular to the optical propagating direction. Specifically, an axis 98a of the first optical coupler section 98 is laterally offset relative to an axis 92 of the other (second and third) optical coupler sections 100, 270 toward a side of the first optical waveguide 84. In this connection, the same reference numbers are attached to components of the seventh-embodiment optical multiplexer/demultiplexer device 310 similar to the components of the fourth-embodiment optical multiplexer/demultiplexer device 260 as the reference numbers attached to the latter components, and explanations of such similar former components will be omitted.

Further, an operation of the seventh-embodiment optical multiplexer/demultiplexer device 310 is similar to that of the fourth-embodiment optical multiplexer/demultiplexer device 260, and thus an explanation of the former operation will be omitted.

Eighth Embodiment of the Optical Multiplexer/demultiplexer Device

Figure 13:
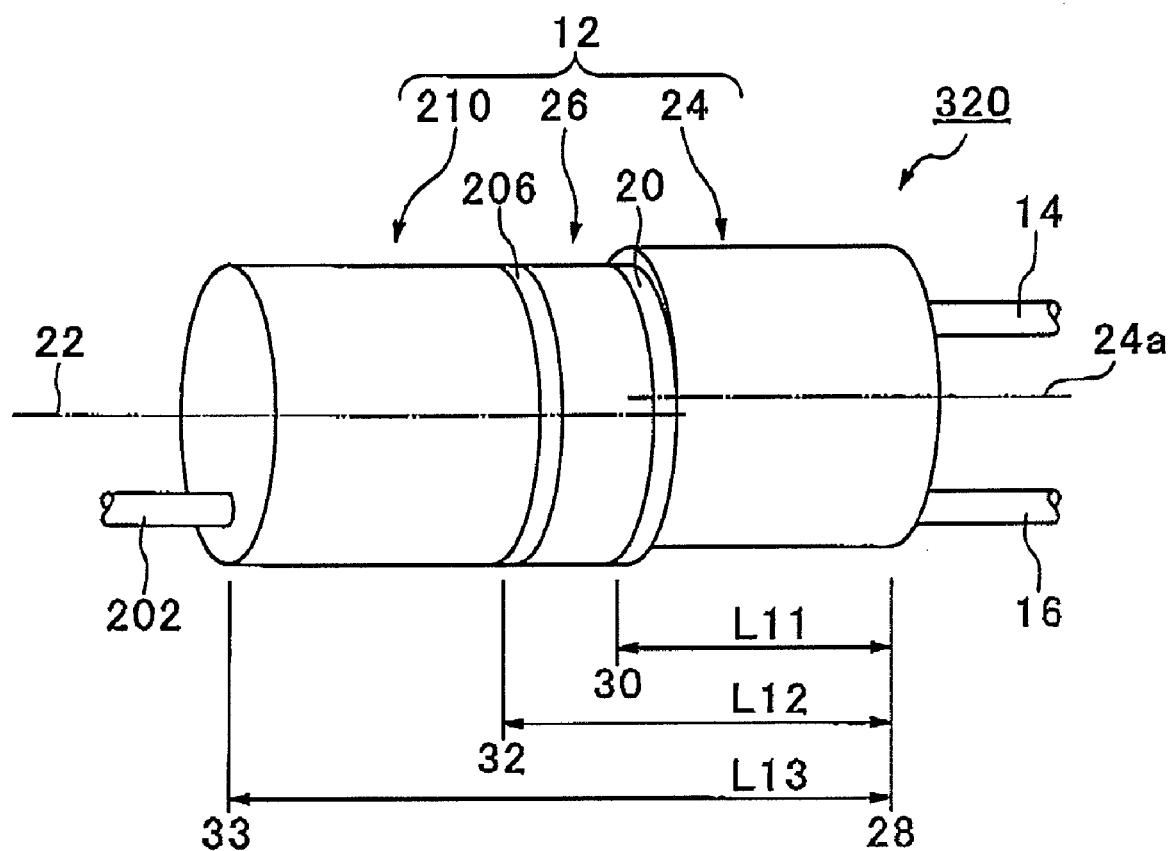
FIG. 13 is a schematic plan view of a rod-lens-type optical multiplexer/demultiplexer device which is an eighth embodiment of the optical multiplexer/demultiplexer device according to the present invention.

Next, an eighth embodiment of the optical multiplexer/demultiplexer device according to the present invention will be explained. FIG. 13 is a schematic plan view of a rod-lens-type optical multiplexer/demultiplexer device which is an eighth embodiment of the optical multiplexer/demultiplexer device according to the present invention. An eighth-embodiment rod-lens-type optical multiplexer/demultiplexer device 320 has almost the same structure as that of the first-embodiment rod-lens-type optical multiplexer/demultiplexer device 200, but there is a difference between them in that the first rod lens 24 is shifted relative to the other rod lenses 26, 210 in a direction perpendicular to the optical propagating direction. Specifically, an axis 24a of the first rod lens 24 in the device 320 is laterally offset relative to an axis 22 of the other (second and third) rod lenses 26, 210 toward a side of the first optical fiber 14. In this connection, the same reference numbers are attached to components of the eighth-embodiment optical multiplexer/demultiplexer device 320 similar to the components of the first-embodiment optical multiplexer/demultiplexer device 200 as the reference numbers attached to the latter components, and thus explanations of such similar former components will be omitted.

Further, an operation of the eighth-embodiment optical multiplexer/demultiplexer device 320 is similar to that of the first-embodiment optical multiplexer/demultiplexer device 200, and thus an explanation of the former operation will be omitted.

Ninth Embodiment of the Optical Multiplexer/Demultiplexer Device

Figure 14:
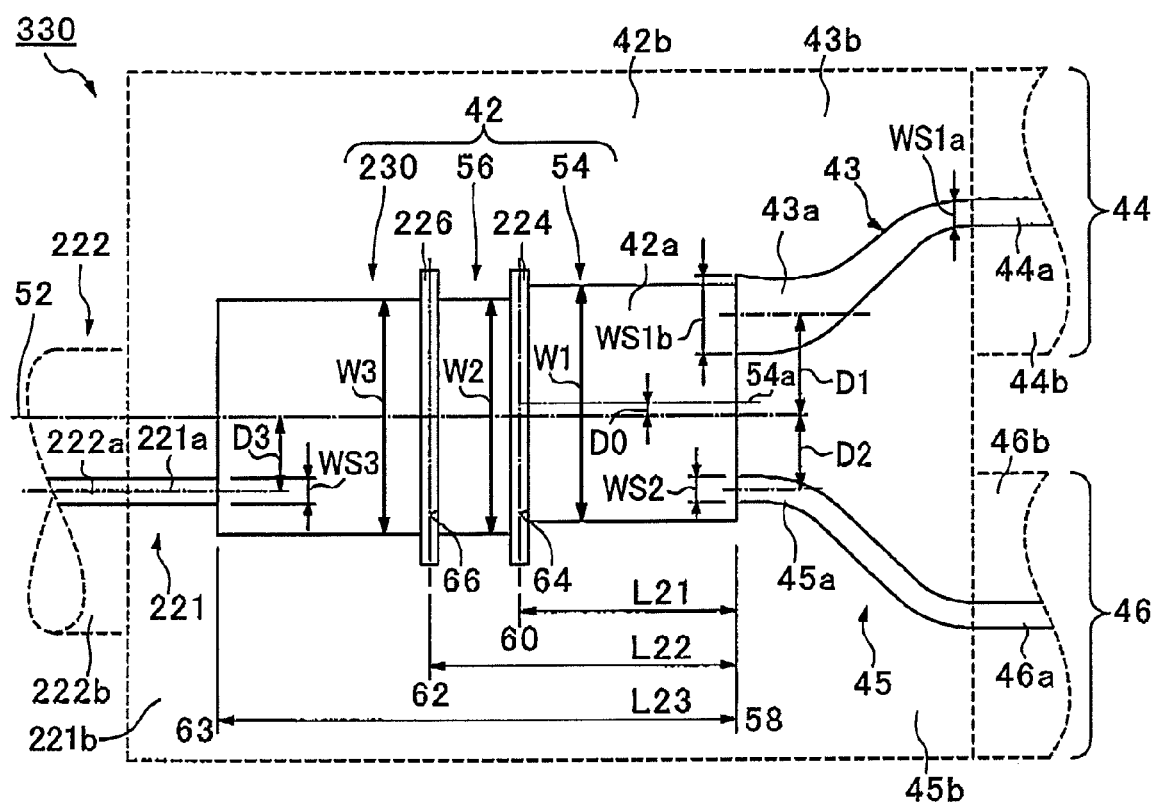
FIG. 14 is a schematic plan view of an MMI-type optical multiplexer/demultiplexer device which is a ninth embodiment of the optical multiplexer/demultiplexer device according to the present invention.

Next, a ninth embodiment of the optical multiplexer/demultiplexer device according to the present invention will be explained. FIG. 14 is a schematic plan view of an MMI-type optical multiplexer/demultiplexer device which is a ninth embodiment of the optical multiplexer/demultiplexer device according to the present invention. A ninth-embodiment MMI-type optical multiplexer/demultiplexer device 330 has almost the same structure as that of the sixth-embodiment MMI-type optical multiplexer/demultiplexer device 300, but there is a difference between them in that in the device 330 a width of the first single-mode optical waveguide 43 is different from that of the second single-mode optical waveguide 45 at the connecting locations 58 where the respective single-mode optical waveguides 43, 45 are connected to the multimode waveguide 42. In this connection, the same reference numbers are attached to components of the ninth-embodiment optical multiplexer/demultiplexer device 330 similar to the components of the sixth-embodiment optical multiplexer/demultiplexer device 300 as the reference numbers attached to the latter components, and explanations of such similar former components will be omitted.

A width of the first optical waveguide 43 of the ninth-embodiment MMI-type optical multiplexer/demultiplexer device 330 in the optical propagating direction at a connecting location where the optical waveguide 43 is connected to the optical fiber 44 is indicated by a symbol WS1a. The width of the waveguide 43 becomes wide toward the multimode waveguide 42, and a width thereof at the connecting location 58 is indicated by a symbol WS1b. The optical waveguide 43 is not necessarily a single-mode one which causes only a fundamental mode of light, depending on how large the width WS1b is, and thus it may be a multimode one which causes a plurality of modes of light.

In the ninth-embodiment MMI-type optical multiplexer/demultiplexer device 330, by changing a position(s) and/or a width(s) of the core(s) of the optical waveguide optically coupled to the multimode optical waveguide 42, and those of the multimode optical waveguide sections 43, 45, 221, efficiency of propagating or coupling light between each of the optical waveguides 43, 45, 221 and the multimode optical waveguide 42 can be enhanced.

Experiments

Next, experiments in which a waveguide excess loss was measured will be explained. In the results of these experiments explained later, a smaller value, namely, a larger absolute value in the decibel unit means a larger amount of waveguide excess loss.

Regarding the second-embodiment MMI-type optical multiplexer/demultiplexer device 220, optical waveguide excess loss was measured. Optical waveguide excess loss regarding a light having a wavelength of 1.49 μm, transmitted through the first optical fiber 44, reflected at the first optical filter 224, and transmitted to the second optical fiber 46 was −0.2 dB. Further, optical waveguide excess loss regarding a light having a wavelength of 1.31 μm, transmitted through the second optical fiber 46 and the first optical filter 224, reflected at the second optical filter 226, and transmitted to the first optical fiber 44 was −0.7 dB. Further, optical waveguide excess loss regarding a light having a wavelength of 1.55 μm, and transmitted through the first optical fiber 44 and the first and second optical filters 224, 226 to the third optical fiber 222 was −0.5 dB.

On the other hand, in a comparable prior art optical multiplexer/demultiplexer device, the second optical filter 226 was omitted and thus only the first optical filter remained. In this comparable device, when both of lights having respective wavelengths of 1.49 μm and 1.31 μm were reflected at the first optical filter 224, and a light having a wavelength of 1.55 μm was transmitted through the first optical filter 224, a waveguide excess loss regarding a light having a wavelength of 1.49 μm, transmitted through the first optical fiber 44, reflected at the first optical filter 224 and transmitted to the second optical fiber 46 was −0.5 dB. Further, a waveguide excess loss regarding a light having a wavelength of 1.31 μm, transmitted through the second optical fiber 46, reflected at the first optical filter 224 and transmitted to the first optical fiber 44 was −0.8 dB. Further, a waveguide excess loss regarding a light having a wavelength of 1.55 μm, transmitted through the first optical fiber 44 and the first optical filter 224 to the third optical fiber 222 was −0.9 dB.

As seen from the above-stated results of the experiment, in the optical multiplexer/demultiplexer device according to the present invention in which two lights having respective wavelengths are reflected by using two optical filters, waveguide excess loss can be reduced more than that in the prior art optical multiplexer/demultiplexer device shown as the comparative example in which two lights having respective wavelengths are reflected by using only one optical filter.

Next, experiments regarding the sixth-embodiment MMI-type optical multiplexer/demultiplexer device 300 will be explained. Concrete dimensions in the used MMI-type optical multiplexer/demultiplexer device 300 were as follows; W1=17.2 μm; W2=17.4 μm; W3=17.2 μm; L21=257 μm; L22=309 μm; L23=576 μ(L23-L22=267 μm); D0=0.8 μm; D1=5.9 μm; D2=4.2 μm; D3=4.2 μm; WS1=WS2=WS3=6.6 μm. Further, the first optical filter 224 was a BBF (Band Blocking Filter) which reflected a light having a wavelength within a range of 1.48-1.50 μm and allowed a light having a wavelength within ranges of 1.26-1.36 μm and 1.55-1.56 μm to be transmitted therethrough, and the second optical filter 226 was a LPF (Long wavelength Pass Filter) which allowed a light having a wavelength within a range of 1.55-1.56 μm to be transmitted therethrough and reflected a light having a wavelength within a range of 1.26-1.36 μm. Further, a light having a wavelength of 1.36 μm was input from the second input/output means 45, 46 and transmitted to the first input/output means 43, 44, unlike the above-stated explanation of the sixth-embodiment MMI-type optical multiplexer/demultiplexer device 300.

This MMI-type optical multiplexer/demultiplexer device 300 was made in the following way.

Firstly, a silicon substrate was processed to form grooves for fixing respective optical fibers, each groove having a V-shaped cross section, and a top surface of the substrate was processed to form a film of $SiO_2$. Then, fluorinated polyimide, namely, a material for a cladding, was spin-coated on the substrate to form a lower cladding layer. Other fluorinated polyimide, namely, a material for a core having a polymerization configuration of fluorine different from that of fluorine of material for the cladding, was spin-coated on the lower cladding layer to form a core layer. Then, the optical waveguides 42, 43, 45, 221 were patterned by means of photography and reactive ion etching processes. Each pattern of the first and second single-mode optical waveguides 43, 45 had an S-curved configuration, while a pattern of the third single-mode optical waveguide 221 had a straight configuration. Then, an upper cladding layer was formed to cover the core layer by spin-coating fluorinated polyimide for the cladding. A value of relative index difference between the core and cladding layers was 0.4%, and a thickness of the core layer was 6.5 μm. Then, two grooves for fixing the first and second optical filters 224, 226 were formed by means of a dicing process. These two grooves 64, 66 were formed to be parallel to each other and across the axis 52 in a direction perpendicular thereto. The above processes were done for a plurality of the optical multiplexer/demultiplexer devices 300 on the silicon substrate at the same time.

Then, the silicon substrate was divided into individual pieces, each piece including the optical multiplexer/demultiplexer device 300. At this step, the silicon substrate extended from the optical multiplexer/demultiplexer device 300 in the opposite directions along the axis 52, on one of the extended portion, grooves for respectively fixing the first and second optical fibers 44, 46 were formed, and on the other extended portions, a groove for fixing the third optical fiber 222 was formed, all three grooves having a V-shaped cross section. These three grooves were formed so that, when the optical fibers 44, 46, 222 were disposed onto the respective grooves, the cores 44a, 46a, 222a of the optical fibers 44, 46, 222 were respectively aligned with cores 43a, 45a, 221a of the optical waveguides 43, 45, 221, and thus fixing of the optical fibers in a passive-alignment way could be achieved. The first and second optical filters 224, 226 were inserted into the respective grooves 64, 66 and adhered thereto, while the optical fibers 43, 45, 221 were fixed onto the V-shaped cross-sectional grooves in the passive-alignment way with an adhesive.

Table 1 shows a result of an optical property evaluation of the above MMI-type optical multiplexer/demultiplexer device 300. In Table 1, the first input/output means 43, 44 is referred to as C-port, the second input/output means 45, 46 is referred to as O-port, and the third input/output means is referred to as V-port. A light having a wavelength of 1.31 μm is transmitted from the O-port to the C-port, a light having a wavelength of 1.49 µm is transmitted from the C-port to the O-port, and a light having a wavelength of 1.55 µm is transmitted from the C-port to the V-port. However, 100 percent of each of the lights is not necessarily transmitted in the above-stated way (namely, insertion loss occurs), and specifically the light may leak (namely, crosstalk occurs) or return back to the input port (namely, return loss occurs). In Table 1, regarding insertion loss, crosstalk and return loss, designed values and actually measured values of strength of a light transmitted from the left-side port to the right-side port indicated in the port column are shown by means of the decibel unit. The designed or calculated values are obtained by using an experimental result calculated by means of the three-dimensional BPM (Beam Propagating Method), a measured value of an optical filter when a collimated light is passed therethrough, measured propagating loss of 0.3-0.5 dB/cm caused by material, and typical coupling loss between an optical fiber and a single-mode optical waveguide.

TABLE 1

| | | Item | | |
|---|---|---|---|---|
| | wavelength | Port | calculated value | actually measured value |
| | | Unit | | |
| | Mm | input-output | DB | dB |
| Insertion loss | 1.31 | O-C | −1.1 | −1.5 |
| | 1.49 | C-O | −1.0 | −1.3 |
| | 1.55 | O-V | −0.9 | −1.2 |
| Crosstalk | 1.31 | O-C | −59 | −67 |
| | 1.49 | C-O | −46 | −45 |
| | 1.55 | O-V | −34 | −29 |
| Return loss | 1.31 | O-C | −38 | −47 |
| | 1.49 | C-O | −37 | **** |
| | 1.55 | O-V | −42 | −46 |

Regarding insertion loss, larger values in the decibel unit thereof, namely, smaller absolute values indicated with the decibel unit thereof are preferable. Regarding crosstalk and return loss, smaller values indicated with the decibel unit thereof, namely, larger absolute values indicated with the decibel unit thereof are preferable. As seen from Table 1, regarding the measured values, the absolute values of insertion loss were smaller than 1.5 dB, those of crosstalk were larger than 29 dB, and those of return loss were larger than 35 dB, these absolute values being preferable results.

Based on the above-stated result, it has been confirmed that the manufactured MMI-type optical multiplexer/demultiplexer device can be preferably used in an access system. Concretely, the manufactured MMI-type optical multiplexer/demultiplexer device can be used as an optical multiplexer/demultiplexer device for a three-wavelength communication WDM system, on a side of home, by connecting the C-port to a central office side, the O-port to an ONU (Optical Network Unit) side and the V-port to a Video-ONU (V-ONU) side, and, on a side of the central office, by connecting the C-port to the home side, the O-port to an OLT (Optical Line Terminator) side and the V-port to a Video-OLT (V-OLT) side.

Further, regarding a light having a wavelength of 1.31 µm, input from the O-port and output to the C-port, an amount of return attenuation was simulated for comparing a case in which an offset amount D0 is 0 µm with another case in which the offset amount D0 is 0.85 µm. Concrete dimensions in the used MMI-type optical multiplexer/demultiplexer device 300 were as follows; W1=17.2 µm; W2=17.0 µm; L21=258 µm; L22=316 µm; D1=5.1 µm; D2=4.9 µm; WS1=WS2=WS3=6.2 µm. When the offset amount D0 is 0 µm, an amount of return attenuation was −26 dB, while, when the offset amount D0 is 0.85 µm, an amount of return attenuation was −36 dB, and thus an absolute value of the return attenuation in the latter case can be become larger than that in the former case.

An example of the ninth-embodiment MMI-type optical multiplexer/demultiplexer device 330 shown in FIG. 14 will be explained. Concrete dimensions in the used MMI-type optical multiplexer/demultiplexer device 330 were as follows; W1=W2=W3=30 µm; L21=2425 µm; L22=2642.5 µm; L23=4752.5 µm, D1=10.6 µm; D2=10.3 µm; D3=10.3 µm; WS1a=6.2 µm; WS1b=10.6 µm; WS2=6.2 µm; WS3= 6.2 µm; D0=0 µm. The first optical filter 224 was a BBF (Band Blocking Filter) which reflected a light having a wavelength within a range of 1.48-1.50 µm, and allowed lights having respective wavelengths within respective ranges of 1.26-1.36 µm and 1.55-1.56 µm to be transmitted therethrough. The second optical filter 226 was a LPF (Long wavelength Pass Filter) which reflected a light having a wavelength within a range of 1.26-1.36 µm and allowed a light having a wavelength within a range of 1.55-1.56 µm to be transmitted therethrough. A light having a wavelength within a range of 1.26-1.36 µm was input from the second optical input/output means 45, 46 and transmitted to the first optical input/output means 43, 44. A light having a wavelength within a range of 1.48-1.50 µm was input from the first optical input/output means 43, 44 and transmitted to the second optical input/output means 45, 46. A light having a wavelength within a range of 1.55-1.56 µm was input from the first optical input/output means 43, 44 and transmitted to the third optical input/output means 221, 222.

Figure 15:
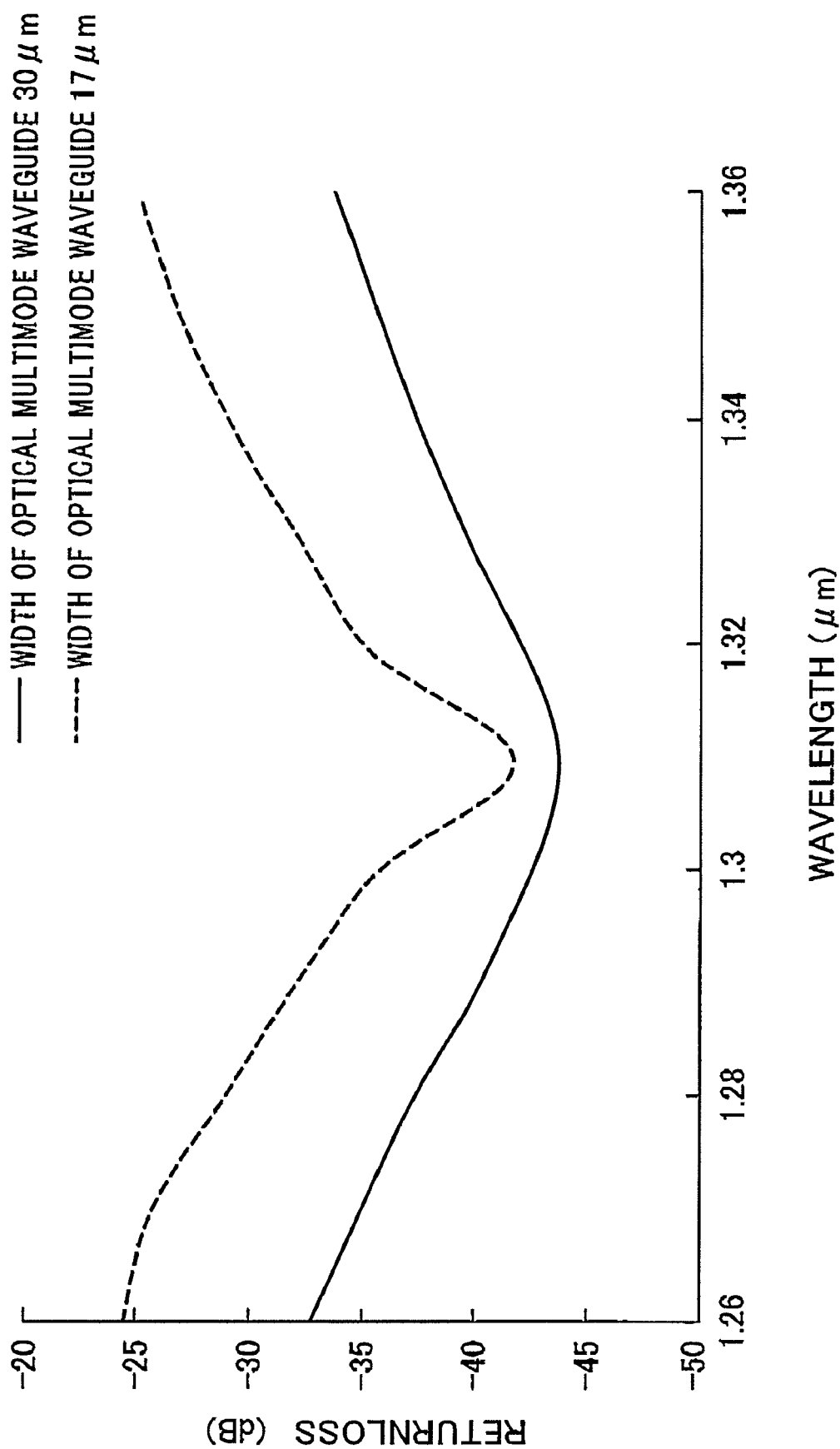
FIG. 15 is a graph showing wavelength dependency of return loss regarding the MMI-type optical multiplexer/demultiplexer device having the above dimensions.
Figure 16:
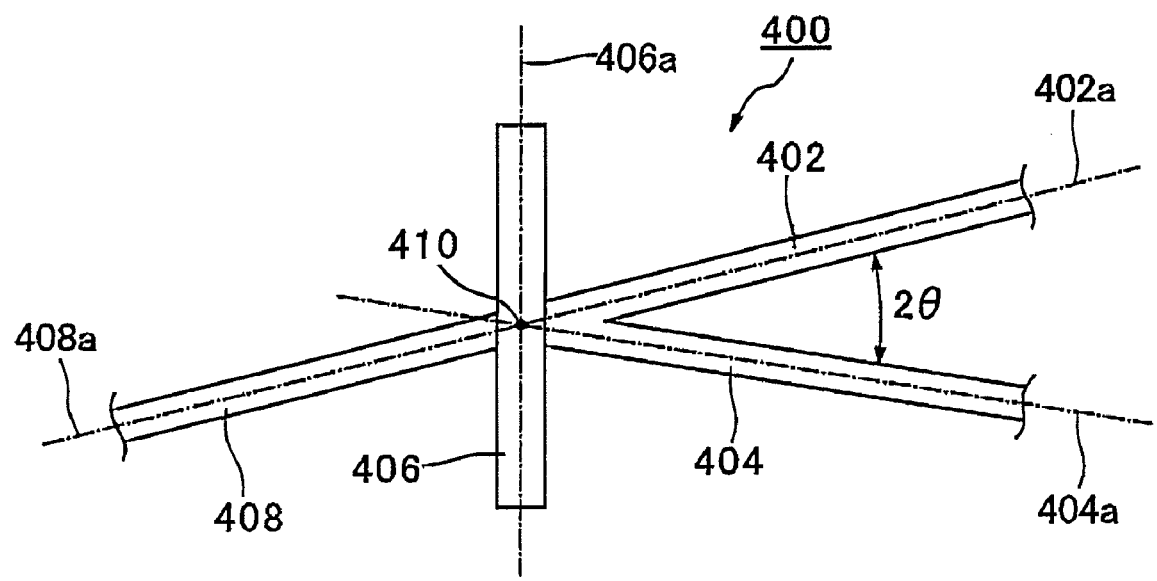
FIG. 16 is a schematic plan view of a prior art straight-optical-waveguide type optical multiplexer/demultiplexer device.
Figure 17:
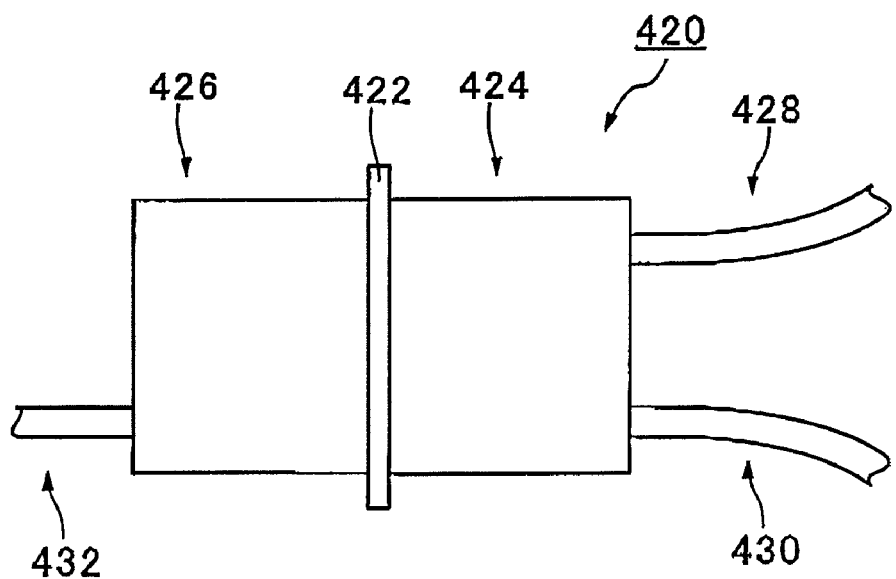
FIG. 17 is a schematic plan view of a prior art multimode-optical-waveguide type optical multiplexer/demultiplexer device.
Figure 18:
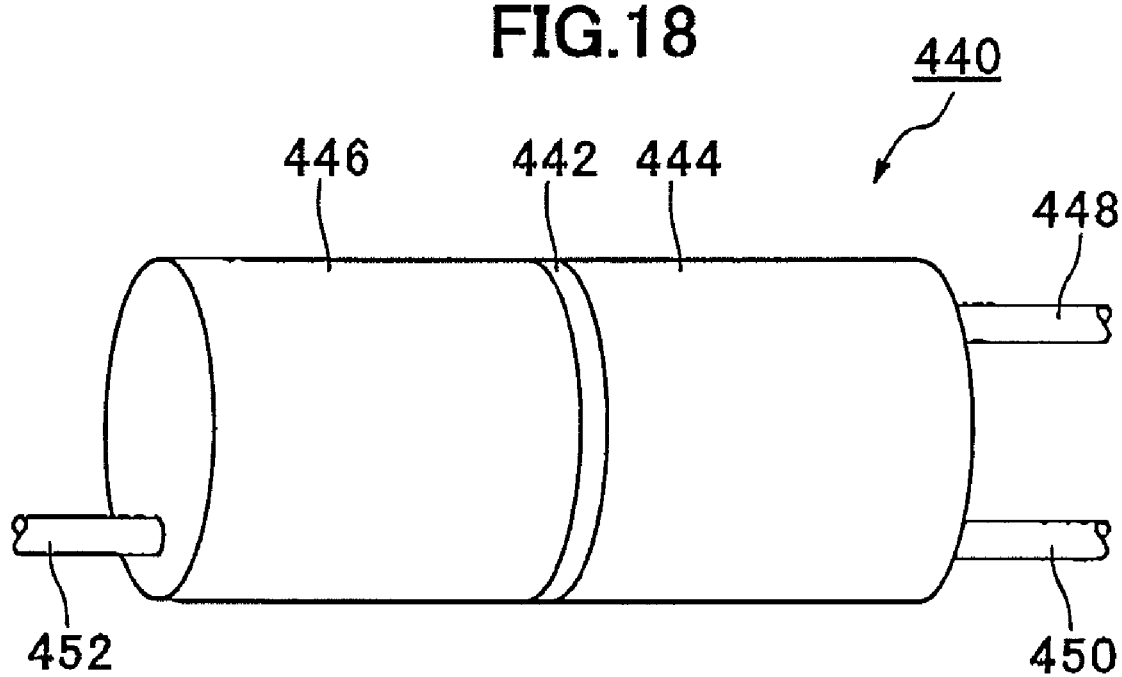
FIG. 18 is a schematic view of a prior art rod-lens type optical multiplexer/ demultiplexer device.

FIG. 15 is a graph showing wavelength dependency of return loss regarding the ninth-embodiment MMI-type optical multiplexer/demultiplexer device having the above dimensions. Return loss shown in FIG. 15 is a ratio of an amount of light returned to the second optical input/output means 45, 46 relative to that of light input from the same means 45, 46 when a light having a wavelength within a range of 1.26-1.36 µm is input from the second optical input/output means 45, 46 and transmitted to the first optical input/output means 43, 44. Further, the above-stated example in which the widths W1, W2, W3 of the respective first, second and third multimode optical waveguide sections 54, 56, 230 are 30 µm were compared with the widths in another example in which these W1, W2, W3 are 17 µm and the lengths L21, L22, L23 were revised accordingly. As seen from the FIG. 15, by increasing the widths W1, W2, W3, return loss of a light having a wavelength within a range of 1.26-1.36 µm can be reduced.

Further, since a distance between the first optical filter 224 and the second optical filter 226 could be increased by increasing the widths W1, W2, W3, work for fixing the optical filters 224, 226 was facilitated.

Further, the above-stated example, in which the width WS1b of the single-mode optical fiber 43 at a location where the first optical fiber 43 was connected to the multimode optical waveguide 42 was 10.6 µm and the width WS2 of the single-mode optical fiber 45 at a location where the second optical fiber 45 was connected to the multimode optical waveguide 45 was 6.2 µm, was compared with another example in which the above widths WS1b, WS2 were 6.2 µm. By increasing the width WS1b as in the above-stated example, excess loss of a light having a wavelength within a range of 1.22-1.36 µm, input from the second optical input/ output means 45, 46 and transmitted to the first optical input/output means 43, 44 could be reduced.

Although the embodiments of the present invention have been explained, the present invention is not limited to these embodiments, that is, these embodiments can be modified in different ways within the scope of the invention defined by the claims. Namely, it goes without saying that these modified embodiments fall within the scope of the present invention.

In the above-stated embodiments, although lights having respective wavelengths of 1.49 and 1.31 μm are input from the first optical input/output means and transmitted to the second optical input/output means, both of the lights may be transmitted in the reverse direction, namely, from the second input/output means to the first input/output means, both of the lights may be transmitted between the first input/output means and the second input/output means in respective directions opposite to each other, or transmitting directions of both of the lights may be changed with time.

Further, in the above-stated embodiments of the optical multiplexer/demultiplexer device according to the present invention, the optical filter mounted to the optical filter fixing means such as a groove has been explained. However, an optical system having a configuration in which the optical filter is omitted from the optical multiplexer/demultiplexer device and which is employed in actual distribution of the device falls within the scope of the present invention, when an optical multiplexer/demultiplexer device can be formed by mounting an optical filter to the optical system.

Further, in the above-stated embodiments, although a LPF (Long wavelength Pass Filter) is employed as an optical filter, an SPF (Short wavelength Pass Filter) or a BPF (Band Pass Filter) may be employed according to the use of the optical filter.

Further, in the fifth embodiment optical reflector and multiplexer/demultiplexer device according to the present invention, although three-wavelength communication has been achieved by employing the three optical filters, four or more filters may be employed to achieve four-or-more-wavelength communication.

Further, the mirror and the optical filter may be fixed to a groove or end or a step, or adhered between sections separately formed in the optical propagating region relative to each other.

Further, in the above-stated embodiments, although the optical propagating region is formed of a rod lens, a multimode optical waveguide or a directional optical coupler, such a region may instead be formed of a light focusing element such as a Fresnel lens, a diffraction grating or a Mach-Zehnder interferometer.

Further, in the above-stated embodiments, although sections partitioned in the optical propagating region by the optical filter or the mirror are formed of the same material, they may be formed of different materials if at least the first rod lens 24 or the first optical waveguide section 54, 128 causes a strength distribution of a propagating light depending on a wavelength thereof. For example, in the first-embodiment optical reflector and multiplexer/demultiplexer device, the second rod lens 26 may be replaced with air. Similarly, in the second-embodiment optical reflector and multiplexer/demultiplexer device, the second optical waveguide section 56 may be replaced with air rather than a multimode optical waveguide, and in the fifth-embodiment optical reflector and multiplexer/demultiplexer device, the second and/or third optical waveguide section(s) 130, 132 may be replaced with air rather than a multimode optical waveguide.

Further, some or all of the above-stated optical fibers may be replaced with (an) optical waveguide(s). Instead of a case where the optical waveguide and the optical fiber are connected to each other, either one of them can be omitted.

Further, in this embodiment, an optical fiber through which a light having a wavelength is input may be replaced with a light-emitting element for emitting a light having the same wavelength as that of the above-stated light, and an optical fiber through which a light having a wavelength is output may be replaced with a light-receiving element for receiving a light having the same wavelength as that of the above-stated light.

Further, positions of the first, second and third optical input/output means 14, 43, 84 relative to the optical propagating region 12, 42, 82 are preferably determined according to wavelengths of light and dimensions of the optical propagating region. Further, shapes, dimensions, relative positions of the sections of the optical propagating region (for example, the first, second and third multimode waveguide sections 54, 56, 230) and the optical input/output means are preferably determined according to designs of insertion loss, crosstalk and an amount of reflection attenuation. For example, as explained in the sixth, seventh, eighth and ninth embodiments of the optical multiplexer/demultiplexer device, the first optical propagating section (the multimode waveguide section 54, the optical coupler section 98, the rod lens section 24) may be offset laterally relative to the other optical propagating section, or any of the optical propagating sections may be offset relative to each other. Further, for example, the widths WS1, WS2, WS3, WS1$a$, WS1$b$ of the single-mode waveguides 43, 45, 221 may be different from each other. Further, in the ninth-embodiment optical multiplexer/demultiplexer device, although the width WS1$b$ is larger than the width WS1$a$, the former may be smaller than the latter if optical coupling between the first single-mode waveguide 43 and the multimode waveguide 42 can be enhanced.

What is claimed is:

1. An optical reflector comprising:
    an optical propagating region causing optical strength distributions depending on respective wavelengths of lights to be propagated in the optical propagating region, and defined by a light-focusing element, a grating, a multimode optical waveguide, a Mach-Zehnder interferometer, or a directional optical coupler,
    a first and second optical input/output means, each being connected to one side of the optical propagating region;
    a mirror disposed on the other side of the optical propagating region; and
    a first optical filter disposed in the optical propagating region between the first and second optical input/output means and the mirror;
    wherein the first optical filter reflects a light having a first wavelength and allows another light having a second wavelength to be transmitted therethrough; and the mirror reflects the light having the second wavelength, so that the lights having the first and second wavelengths are respectively reflected at the first optical filter and the mirror and thus are propagated between the first input/output means and the second input/output means, and
    wherein a distance between the first and second input/output means and the first optical filter and a distance between the first and second input/output means and the mirror are respectively and independently defined according to amounts of insertion loss regarding the light having the first wavelength and the other light having the second wavelength.

2. The optical reflector according to claim 1, further comprising an additional optical filter or additional optical filters disposed between the first optical filter and the mirror;

wherein the additional optical filter or each of the additional optical filters reflects a light having a corresponding wavelength transmitted through the first optical filter, and, if it has it/them, the other additional filter(s) located on a side of the first and second input/output means relative thereto, and allows the light having the second wavelength to be transmitted therethrough, so that the lights having the first and second wavelengths and the corresponding wavelength(s) are respectively reflected at the first optical filter, the mirror and the corresponding additional filter(s) and thus are propagated between the first input/output means and the second input/output means, and wherein (a) distance(s) between the first and second input/output means and the additional filter(s) is/are independently defined according to (an) amount(s) of insertion loss regarding the light(s) reflected at the corresponding additional filter(s).

3. The optical reflector according to claim 1 or 2, wherein the optical propagating region includes a first optical propagating section between the first and second input/output means and the optical filter disposed closest thereto; and wherein the first optical propagating section is offset relative to the other propagating sections in a direction perpendicular to a light propagating direction.

4. An optical system comprising:

an optical propagating region causing optical strength distributions depending on respective wavelengths of lights to be propagated in the optical propagating region, and defined by a light-focusing element, a grating, a multimode optical waveguide, a Mach-Zehnder interferometer, or a directional optical coupler;

a first and second optical input/output means, each being connected to one side of the optical propagating region;

a third optical input/output means connected to the other side of the optical propagating region; and optical-filter-mounting means for mounting at least two optical filters in the optical propagating region between the first and second optical input/output means and the third optical input/output means, wherein, when first and second optical filters are mounted to the optical-filter-mounting means, the first optical filter on a side of the first and second optical input/output means reflects a light having a first wavelength and allows other lights having a second and third wavelengths to be transmitted therethrough, the second optical filter on a side of the third optical input/output means reflects the light having the second wavelength and allows the light having the third wavelength to be transmitted therethrough, the lights having the first and second wavelengths are respectively reflected at the first and second optical filters and thus are propagated between the first input/output means and the second input/output means, and the light having the third wavelength is propagated between the first or second input/output means and the third input/output means; and wherein a distance between the first and second input/output means and an optical-filter-mounting means for the first optical filter, a distance between the first and second input/output means and another optical-filter-mounting means for the second optical filter, and a distance between the first and second input/output means and the third input/output means are respectively and independently defined according to amounts of insertion loss regarding the lights having the first wavelength, the second wavelength and the third wavelength.

5. The optical system according to claim 4, wherein the optical propagating region includes a first optical propagating section between the first and second input/output means and the optical filter disposed closest thereto; and wherein the first optical propagating section is offset relative to the other propagating sections in a direction perpendicular to a light propagating direction.

6. The optical system according to claim 4, wherein the optical-filter-mounting means is a groove disposed in the optical propagating region.

7. The optical system according to claim 4, wherein each of the first, second and third input/output means is a single-mode optical waveguide.

8. The optical system according to claim 4, wherein each of the first and second input/output means is a single-mode optical waveguide, and the third input/output means is an optical fiber.

9. An optical multiplexer/demultiplexer device comprising:

an optical propagating region causing optical strength distributions depending on respective wavelengths of lights to be propagated in the optical propagating region, and defined by a light-focusing element, a grating, a multimode optical waveguide, a Mach-Zehnder interferometer, or a directional optical coupler;

a first and second optical input/output means, each being connected to one side of the optical propagating region;

a third optical input/output means connected to the other side of the optical propagating region; and first and second optical filters disposed in the optical propagating region between the first and second optical input/output means and the third optical input/output means;

wherein the first optical filter on a side of the first and second optical input/output means reflects a light having a first wavelength and allows other lights having a second and third wavelengths to be transmitted therethrough, and the second optical filter on a side of the third optical input/output means reflects the light having the second wavelength and allows the light having the third wavelength to be transmitted therethrough so that the lights having the first and second wavelengths are respectively reflected at the first and second fitters and thus are propagated between the first input/output means and the second input/output means, and the light having the third wavelength is propagated between the first or second input/output means and the third input/output means; and wherein a distance between the first and second input/output means and the first optical filter, a distance between the first and second input/output means and the second optical filter, and a distance between the first and second input/output means and the third input/output means are respectively and independently defined according to amounts of insertion loss regarding the lights having the first wavelength, the second wavelength and the third wavelength.

10. The optical multiplexer/demultiplexer device according to claim 9, further comprising an additional optical filter or additional optical filters disposed between the first optical filter and the second optical filter;

wherein the additional optical filter or each of the additional optical filters reflects a light having a corresponding wavelength transmitted through the one of the two optical filters on the side of the first and second optical input/output means, and, if it has it/them, the other additional filter(s) located on a side of the first and second input/output means relative thereto, and allows the light having the second wavelength to be transmitted therethrough, so that the lights having the first and second wavelengths and the corresponding wavelength(s) are respectively reflected at the first and second optical filters and the corresponding additional filter(s) and thus are propagated between the first input/output means and the second input/output means, and wherein (a) distance(s) between the first and second input/output means and the additional filter(s) is/are independently defined according to (an) amount(s) of insertion loss regarding the light(s) reflected at the corresponding additional filter(s).

11. The optical multiplexer/demultiplexer device according to claim 9 or 10, wherein the optical propagating region includes a first optical propagating section between the first and second input/output means and the optical filter disposed closest thereto; and wherein the first optical propagating section is offset relative to the other propagating sections in a direction perpendicular to a light propagating direction.

12. The optical multiplexer/demultiplexer device according to claim 9 or 10, wherein each of the first, second and third input/output means is a single-mode optical waveguide.

13. The optical multiplexer/demultiplexer device according to claim 9 or 10, wherein each of the first and second input/output means is a single-mode optical waveguide, and the third input/output means is an optical fiber.

14. The optical reflector according to claim 1, wherein the optical filter allows the light having the third wavelength to be transmitted, and the mirror is defined by a second optical filter reflecting the light having the second wavelength and allows a light having a third wavelength to be transmitted therethrough.

15. The optical system according to claim 5, wherein the optical-filter-mounting means is a groove disposed in the optical propagating region.

16. The optical system according to claim 5, wherein each of the first, second and third input/output means is a single-mode optical waveguide.

17. The optical system according to claim 6, wherein each of the first, second and third input/output means is a single-mode optical waveguide.

18. The optical system according to claim 15, wherein each of the first, second and third input/output means is a single-mode optical waveguide.

19. The optical system according to claim 5, wherein each of the first and second input/output means is a single-mode optical waveguide, and the third input/output means is an optical fiber.

20. The optical system according to claim 6, wherein each of the first and second input/output means is a single-mode optical waveguide, and the third input/output means is an optical fiber.

21. The optical system according to claim 15, wherein each of the first and second input/output means is a single-mode optical waveguide, and the third input/output means is an optical fiber.

22. The optical multiplexer/demultiplexer device according to claim 11, wherein each of the first, second and third input/output means is a single-mode optical waveguide.

23. The optical multiplexer/demultiplexer device according to claim 11, wherein each of the first and second input/output means is a single-mode optical waveguide, and the third input/output means is an optical fiber.

* * * * *